United States Patent
Davidson et al.

(10) Patent No.: US 9,613,523 B2
(45) Date of Patent: Apr. 4, 2017

(54) INTEGRATED HAZARD RISK MANAGEMENT AND MITIGATION SYSTEM

(71) Applicant: Edison Global Circuits, LLC, Spring, TX (US)

(72) Inventors: Alistair Davidson, Mountain View, CA (US); Drew H. Webb, Manhattan Beach, CA (US)

(73) Assignee: Unilectric, LLC, Round Rock, TX (US)

(*) Notice: Subject to any disclaimer, the term of this patent is extended or adjusted under 35 U.S.C. 154(b) by 87 days.

(21) Appl. No.: 14/697,716

(22) Filed: Apr. 28, 2015

(65) Prior Publication Data
US 2016/0163186 A1    Jun. 9, 2016

Related U.S. Application Data

(60) Provisional application No. 62/089,353, filed on Dec. 9, 2014.

(51) Int. Cl.
| | |
|---|---|
| G08B 29/00 | (2006.01) |
| G08B 29/04 | (2006.01) |
| G05B 15/02 | (2006.01) |
| G05B 19/042 | (2006.01) |
| G06Q 10/06 | (2012.01) |
| G06Q 50/06 | (2012.01) |
| G06Q 50/16 | (2012.01) |
| G05B 23/02 | (2006.01) |

(52) U.S. Cl.
CPC ............ G08B 29/04 (2013.01); G05B 15/02 (2013.01); G05B 19/0428 (2013.01); G06Q 10/0635 (2013.01); G06Q 50/06 (2013.01); G06Q 50/16 (2013.01); G05B 23/0235 (2013.01)

(58) Field of Classification Search
CPC ........ G08B 29/00; G08B 29/02; G08B 29/04; G08B 29/043; G08B 29/06; G01R 31/02; G01R 31/024; G01R 31/025; G01R 31/026; G01R 31/08
See application file for complete search history.

(56) References Cited

U.S. PATENT DOCUMENTS

| | | | |
|---|---|---|---|
| 6,686,838 B1* | 2/2004 | Rezvani | G06F 21/31 340/10.1 |
| 2006/0052905 A1* | 3/2006 | Pfingsten | H01R 9/2425 700/286 |
| 2009/0216349 A1* | 8/2009 | Kwon | H04W 52/0219 700/33 |
| 2011/0043958 A1* | 2/2011 | Nakamura | H02H 6/00 361/93.8 |
| 2014/0067137 A1* | 3/2014 | Amelio | H03K 17/00 700/286 |
| 2014/0327995 A1* | 11/2014 | Panjwani | H02H 3/05 361/93.1 |
| 2014/0375440 A1* | 12/2014 | Rezvani | G06F 21/31 340/12.29 |

* cited by examiner

Primary Examiner — Van Trieu

(57) ABSTRACT

A system for hazard mitigation in a structure including a subsystem coupled to a circuit of an electrical distribution system and set of nodes. The nodes monitor operating conditions of the circuit and generate data in response. A data processing system is operable to process the data generated by the set of nodes and in response identify a trigger representing a condition requiring that an action be taken. The data processing system processes the trigger in accordance with a predetermined policy to initiate an action by the subsystem.

36 Claims, 14 Drawing Sheets

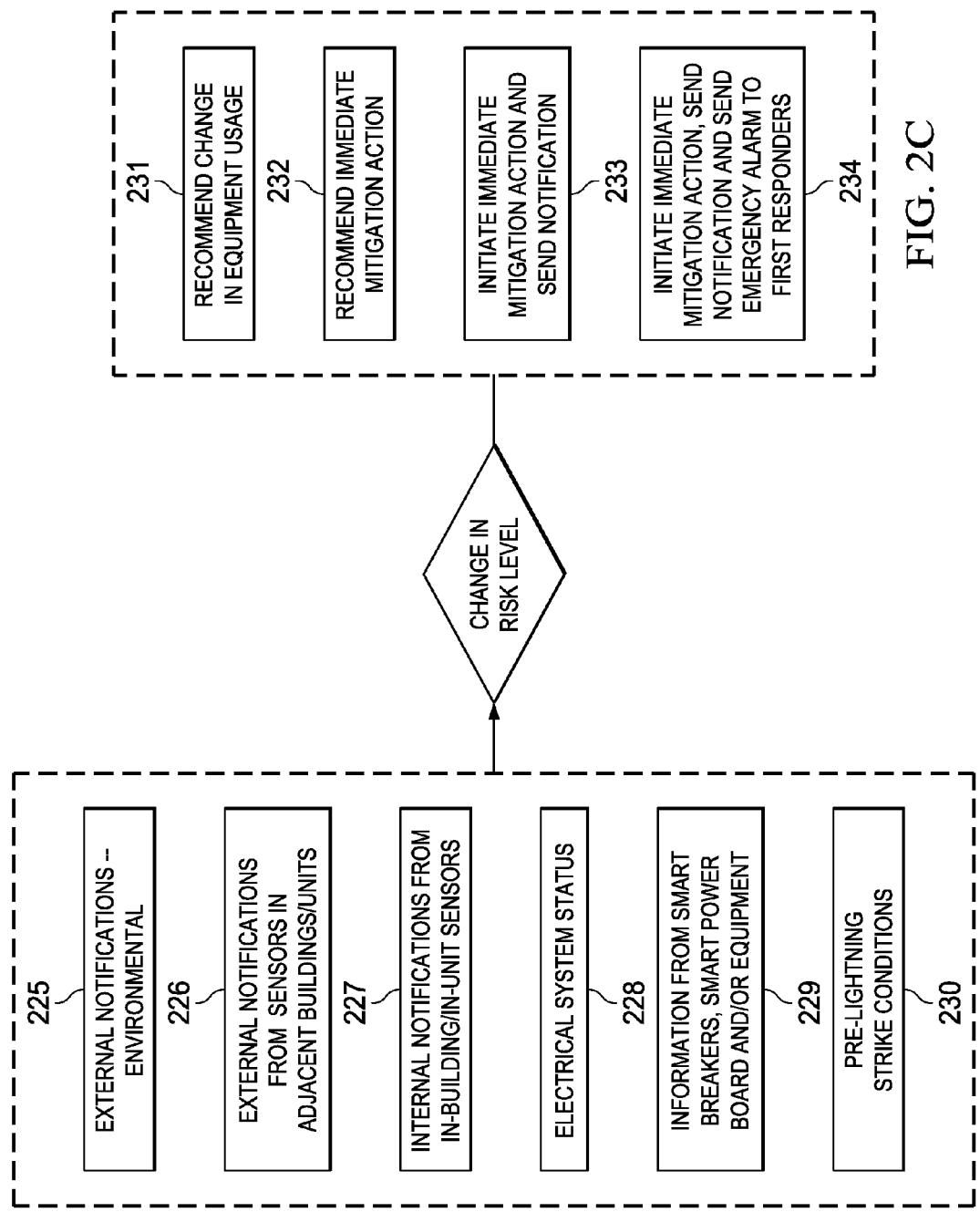

| Dashboard | | | | | | |
|---|---|---|---|---|---|---|
| Configuration | Good job! You successfully updates Stove's configuration. ☒ | | | | | |
| | Configuration Dashboard | | | | | |
| | Current Devices | | | | | |
| Notifications | # Category | Epic Short Name | Epic Description | Monitoring Status | Setup Status | User Type | Logged Data |
| Type-2 Message | 1 Configuration | Equipment | Setting up system to recognize components of the system to be monitored | Active | Published | Administrator | Date, Change Made, User |
| | 2 Configuration | Equipment Controller Account | Setting up equipment controller account and user level | Not active | Factory Default | Administrator | Date, Change Made, User |
| | 3 Configuration | Equipment | Setting up controller deligation on individual equipment and equipment policies. | Not active | User Default | Administrator | Date, Change Made, User |
| | 4 Configuration | Equipment | Setting up controller deligation on individual equipment and equipment policies. | Danger | Published | Administrator | Date, Change Made, User |
| | 5 Configuration | Equipment | Setting up controller deligation on individual equipment and equipment policies. | Not active | In-progress | Administrator | Date, Change Made, User |
| | ▼ 1 2 3 4 5 ▲ | | | | | |

INTEGRATED HAZARD RISK MANAGEMENT AND MITIGATION SYSTEM

CROSS-REFERENCE TO RELATED APPLICATION

The present application claims the benefit of U.S. Provisional Patent Application Ser. No. 62/089,353, filed Dec. 9, 2014, which is incorporated herein by reference for all purposes.

FIELD OF INVENTION

The present invention relates in general managing hazard risk related to residential and commercial structures, and in particular to an integrated hazard risk management and mitigation system.

BACKGROUND OF INVENTION

The owners and occupants of any structure, including homes, office buildings, and industrial spaces are continuously subjected to the risks presented by hazards, such as fire, flooding, electrical anomalies, and so on. For example, it is well known that fire prevention and control has been a long term problem for civilization. In the past, the prevention of fires spreading was the primary reason for the development of fire brigades. In modern times, most developed countries have also put in place building codes to reduce the probability of fire. In addition, smoke and fire detectors, either legally mandated or voluntarily installed, have help mitigate the consequences of fires by reducing the amount of time before an occupant is notified of a fire, particularly in situations where the fire is remote from the person at risk or in situations where smoke might quickly overcome an occupant.

Historically, evaluating the risks presented to the owners and occupants of homes and businesses has been based on observing and analyzing events as they were happening or after they had happened. In the case of fire prevention, at least for most building owners, information about the fire status of a building is only provided when a fire has already started or when smoke has been detected.

SUMMARY OF INVENTION

One exemplary embodiment of the principles of the present invention is a system for hazard mitigation in a structure. The system for hazard mitigation includes a subsystem coupled to the a circuit of an electrical distribution system and set of nodes, which monitor operating conditions of the branch circuit and generate data in response. A data processing system processes the data generated by the set of nodes to identify a trigger representing a condition requiring that an action be taken. The data processing system processes the trigger in accordance with a predetermined policy to initiate an action by the subsystem.

Another exemplary embodiment of the present inventive principles is system for mitigating risk associated with an electrical distribution system. The system includes a communications network and a set of sensors coupled to the communications network for monitoring conditions associated with the electrical distribution system. A set of subsystems are coupled to the electrical distribution system, each of which includes a data processor and communications circuitry coupled to the communications network. In response to data from the set of sensors, the data processor of a selected subsystem identifies a trigger representing a condition requiring that an action be taken and in response initiates an action in accordance with a policy. A supervisory subsystem coupled to the communications network provides trigger definitions and policies to at least the data processor of the selected subsystem.

The electrical system of a structure, whether residential or commercial, is both a direct source of electrical hazards and a common initiator of fires. To reduce the risk of fire and injuries presented by the electrical system of a structure, the preferred embodiments of the present integrated hazard risk management and mitigation system continuously monitor the status of the electrical system of the structure for electrical system anomalies, such as overload conditions, arc faults, and ground faults. In addition, information is also gathered from a second set of sensors monitoring non-electrical system conditions, such as pre-lightning strike conditions, gas accumulations, and water accumulations. From the totality of the collected information, the electrical system is selectively switched-off, either in whole or in part, before the actual hazard event occurs.

In addition, notifications are selectively sent to interested parties, based on a predetermined set of rules, informing the receiving party or parties of detected pre-event conditions and actual events (e.g., fires), as well as their consequences. Along with notifying the owner of the structure, its occupants, the fire department, police, and/or the electric utility, specialized notifications may also be sent directly to commercial servicer providers such that repairs to the electrical system and/or equipment operating off the electrical system (e.g., heating and air conditioning, kitchen appliances) can be made. Notifications may also be sent to the owner or occupant of the structure when a piece of electrical equipment has been inadvertently left on (e.g., a stove or other kitchen appliance has been drawing current for an inordinately long period of time).

While the major advantage of the present integrated hazard risk management and mitigations system is the reduction in the risk of structural loss or damage and/or personal injury, these systems also provide for peace-of-mind and financial benefits, as well. For example, insurance companies, always concerned with the reduction in hazard risks, may reduce their rates for individuals and businesses implementing such a system in their homes, offices, or other commercial spaces. Utility companies may become less concerned with the waste of energy due to faults in the electrical system and the connected electrical equipment. Home owners will be able to more quickly identify problems with their appliances and heating and air conditioning systems, thereby allowing for early repair and the subsequent financial savings resulting from efficiently operating electrical equipment.

BRIEF DESCRIPTION OF DRAWINGS

For a more complete understanding of the present invention, and the advantages thereof, reference is now made to the following descriptions taken in conjunction with the accompanying drawings, in which:

FIG. 2C is a more detailed diagram showing exemplary changes in risk indicated by various events detected by the hardware components of FIG. 1A and the resulting actions taken according to the illustrated embodiment of the present principles;

FIG. 7B illustrates an exemplary configuration dashboard presented on the user interface of FIG. 1A;

DETAILED DESCRIPTION OF THE INVENTION

The principles of the present invention and their advantages are best understood by referring to the illustrated embodiment depicted in FIGS. 1-7 of the drawings, in which like numbers designate like parts.

Figure 1A:
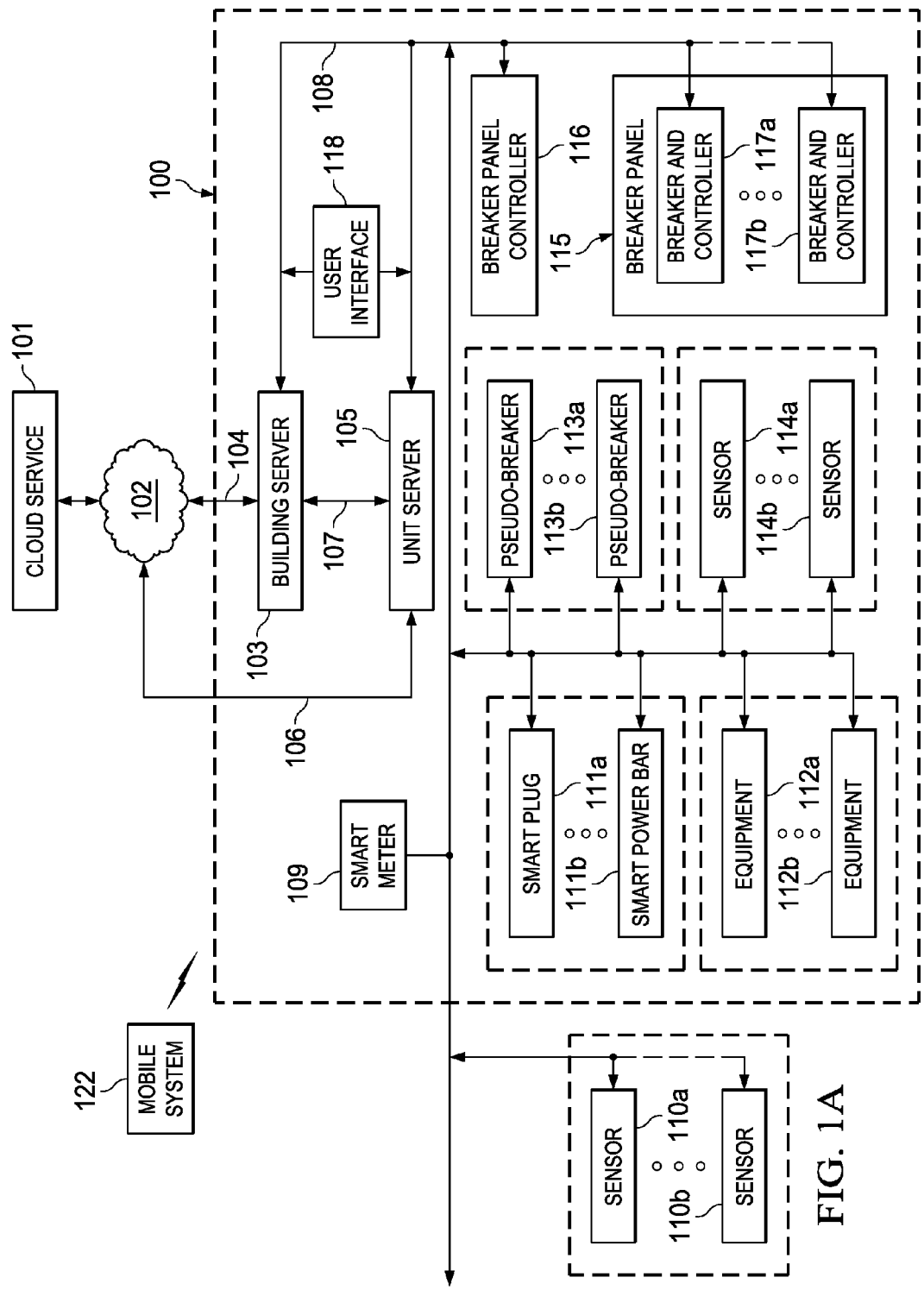
FIG. 1A is a block diagram of a networked integrated hazard risk management and mitigation system embodying the principles of the present invention.

FIG. 1A is a block diagram of a networked integrated hazard risk management and mitigation system 100 embodying the principles of the present invention. System 100 is suitable for use in and around any form of building or enclosure that is serviced by electricity and is therefore prone to the risks presented by its electrical system, including the risks of fire and electrocution. For example, structure 100 may be residential housing (e.g., a home, apartment, or condominium), a commercial building (e.g., an office building, large or small retail outlet, or sports and entertainment facility), an industrial building (e.g., a manufacturing facility), or an equipment infrastructure (e.g., as oil platform or other industrial/transportation infrastructure).

Figure 1B:
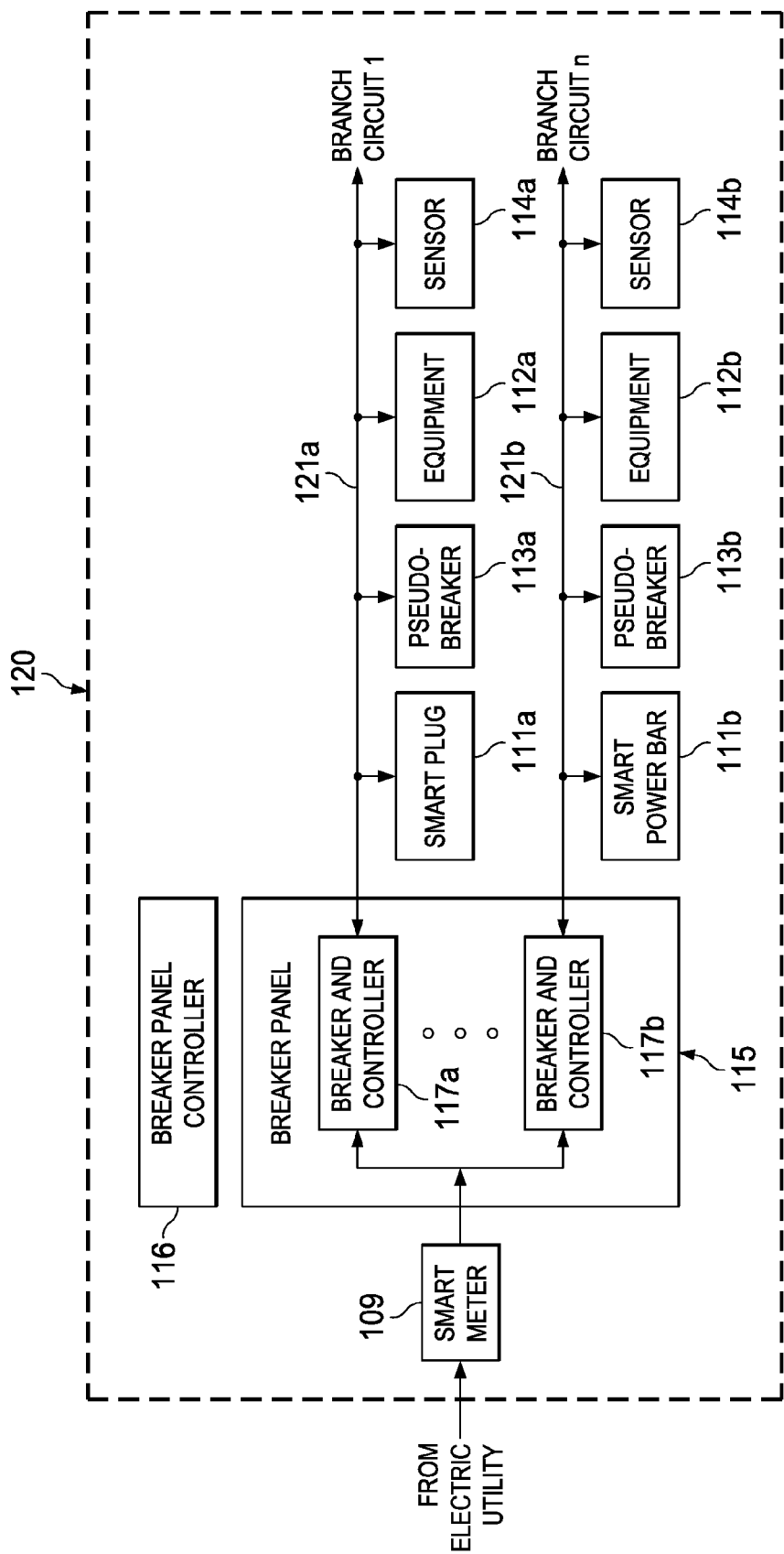
FIG. 1B is a block diagram of an electrical distribution system of a structure serviced by the hazard risk management system of FIG. 1A.

The block diagram of FIG. 1B shows portions of system 100 as is relates to the electrical distribution system 120 servicing the structure. Electrical system 120 includes n number of branch circuits (where n is an integer), two of which are shown for reference as branches circuits 121a and 121b. The actual number of branch circuits will vary depending on the electrical requirements of the structure. In addition, depending on the requirements of the structure, electrical distribution system 120 may provide either single-phase or three-phase power.

System 100 uses various sensors distributed in and around the structure to gather information and assess fire, electrical, and other risks associated with the structure and its surroundings, including adjacent structures or units. Risk analysis is performed, in the illustrated embodiment, using pattern recognition and machine learning, discussed below. Furthermore, human analysts may also be permitted to subscribe to the collected data for human based statistical analysis.

System 100 includes, or alternatively is serviced by, a cloud service 101 through a cloud 102, which may be a global public electronic communications network, such as the Internet, or a private or governmental electronic communications network. As discussed further below, cloud service 101 is preferably used to implement such tasks as analytics, electricity usage prediction, comparative and regional risk analysis, pricing comparison, and the integration of gas/electricity status information from the utility provider with in-structure and adjacent information In the illustrated embodiment, hardware components within structure 100 communicate with cloud 102 through a building server 103 and a unit server 105. In alternate embodiments, only a building server 103 or a unit server 105 may be required. For example, in the case of an apartment building or office building, a building server 103 may be provided to manage and control overall operations within the building while a unit server 105 may be provided to each individual apartment unit or office. Building server 103 and/or unit server 105 are preferably used to execute such tasks as system setup, risk level setting, notification policy, notification templates, security and permissions, first responder policy setting, contact information, maintenance equipment inventory, history reporting, current risk level, tracking and the generation of recommendations, as discussed in detail below.

In the illustrated embodiment, a communications and control network is established, which includes a link 104 between building server 103 and cloud 102, a link 106 between unit server 105 and cloud 102, and an internal link 108 between building server 103 and unit server 105 and the system hardware components discussed below.

Generally, application of the principles of the present invention is independent of the particular communications protocols or physical path used. Hence, in some embodiments, some or all of links 104, 106, and 108 are implemented, in whole or in part, with a local wireless subsystem, such as WiFi subsystem, Zigbee subsystem, home appliance control system, wireless local area network (WLAN), or a wide area network (WAN) established through a mobile (cellular) network, such as a 3G or 4G telecommunications network. In alternate embodiments, one or more of links 104, 106, and 108 may be implemented, in whole or in part, with a hardwired communications and control path, such as a digital subscriber line (DSL) connection to the Internet, a television cable connection, hardwired local area network, or ethernet over powerline system.

Networking management, including the reporting and control of individual subsystems with hard and soft trip capabilities, communications control, and local policy execution when the risk level demands fast response or when external networks not available, is preferably implemented with at least one of building server 103 and unit server 105.

Electrical power from an electric utility is provided through a smart meter 109, as shown in FIG. 1B. Smart meter 109 includes one or more embedded processors and communicates through the remainder of system 100 across communications link 108. Electrical power flowing through smart meter 109 is passed through a breaker panel 115, which includes a set of n number of "smart" breakers, two of which are shown as breakers 117a and 117b, corresponding to the n number of branch circuits 120. In the preferred embodiment, each breaker 117 includes embedded processing circuitry including a microprocessor, microcontroller, or digital signal processor and a set of embedded sensors for detecting such conditions such as branch circuit overloading, arc faults, ground faults, and pre-lightning strike conditions. The overall operation of breaker panel 115 is monitored and controlled through a breaker panel controller 116, including a microprocessor, microcontroller, or digital signal processor.

As discussed further below, system 100 gathers information using sensors disposed at various points in and around the structure. The available sensors include an external set of sensors, two of which are shown as sensors 110a and 110b in FIG. 1A, for monitoring conditions external to the structure. Depending on the particular embodiment of system 100, sensors 110 monitor for various conditions such as temperature, smoke, gas main leaks, natural gas, toxic gas, radon, $CO_2$, carbon monoxide, water, and ground movement. External sensors 110 also advantageously provide for the assessment of adjacency risks based upon information about neighboring units, offices, buildings, or other sources of external risk (e.g., train routes that carry toxic substances).

Within the structure, system 100 includes a set of smart plugs and smart power bars. A representative smart plug is shown at 111a and a representative smart power bar is shown at 111b. Each smart plug or power bar includes embedded processing circuitry including a microprocessor, microcontroller, or digital signal processor that allows for monitoring and control of electricity usage at the plug-in point. Individual smart plugs, as well as smart power bars, preferably include tripping circuitry (e.g., an embedded breaker) and communications circuitry (wired or wireless), which allow for individual plugs to be tripped in response to the embedded processing circuitry or in response to a command from an external device or subsystem (e.g., a pseudo-breaker discussed below). In addition, the communications circuitry allows electrical usage information and state information to be transmitted to an external device or subsystem of system 100 either directly or in response to polling.

The illustrated embodiment of system 100 includes various equipment including internal monitoring and reporting capabilities, two of which are shown as equipment blocks 112a and 112b. Equipment 112 includes household appliances, industrial equipment, office equipment, and so on. Preferably, a piece of equipment 112 includes embedded processing circuitry including a microprocessor, microcontroller, or digital signal processor for monitoring and controlling electricity usage, operational parameters, and state information and communications circuitry for exchanging information and commands with an external device or another subsystem of system 100. In addition, a piece of equipment 112 also includes tripping circuitry (e.g., an embedded breaker), which can be tripped by the embedded processing circuitry or in response to in response to a command from an external device or subsystem (e.g., a pseudo-breaker discussed below).

System 100 also includes a set of pseudo-breakers ("virtual breakers"), two of which are shown as pseudo-breakers 113a and 113b. Each pseudo-breaker 113 provides electrical measurement functionality and then delegates the soft or hard trip operation to one or more subsystems with breaking capability (e.g., smart plugs 111, equipment 112, breakers 117). Pseudo-breakers 113 provide multiple advantages, including the ability to communicate (wired or wirelessly) with one more other controllers within system 100, have internal or external policies attached to them (discussed below), can trigger soft or hard breaker events, and can restart breakers (e.g., a breaker 117 or an embedded breaker within a smart plug/smart power bar 111 or piece of equipment 112) using a timing interval or by direct command to the soft break initiating devices.

System 100 further includes a set of internal sensors, two of which are shown in FIG. 1A as sensors 114a and 114b. Generally, each sensor 114 provides contemporary or contemporary and historical information through measurements, that can be used for fire risk assessment, analysis and management. Sensors 114 monitor electrical distribution system 120 directly and indirectly.

Sensors 114 monitoring electrical distribution system 120 directly measure such parameters as electrical distribution system state, electrical distribution system events, parameters needed for time series analysis of electrical distribution system 120 faults, and/or electrical spikes and patterns of faults and spikes. Sensors 114 indirectly monitoring electrical distribution system 120 measure for such parameters as temperature, water flooding, gas main leaks, natural gas, toxic gas, radon, $CO_2$, carbon monoxide, and ground movement. Depending on the embodiment of system 100, sensors 114 may also include equipment specific sensors, and non-electrical system sensors.

One particular sensor 114 is an intelligent smoke detector including an embedded microprocessor, microcontroller, digital signal processor, and/or telecommunications function. The intelligent smoke detector may also include a sound based notification alternative to be detected by other devices around the structure with communications capabilities.

In addition to gathering information from external sensors 110 and internal sensors 114, system 100 may also access information, such as extreme weather forecasts, lightning strike patterns, earthquake warnings and occurred events, from cloud 102 through building server 103 and optionally unit server 105.

The processing circuitry within each breaker 117 executes algorithms for the detection and management of branch circuit-specific ground and arc faults and overload conditions. These algorithms may also be executed by breaker panel controller 116 in the preferred hierarchical structure of system 100 discuss below, which provides or redundancy and rapid and efficient risk mitigation under varying circumstances.

Communications circuitry within individual breakers 117, as well as communications circuitry associated with breaker panel controller 116, allows electrical usage information and state information to be transmitted to an external device or subsystem of system 100 and commands and polls to be received from another device or subsystem of system 100. Consequently, for example, a pseudo-breaker 113 can command a given breaker 117 by direct communications or through breaker panel controller 116.

System 100 includes a user interface system 118, which could be a fixed panel with a display screen and an input device such as a touchpad or keyboard, a personal computer, or a mobile device, such as a smart phone, laptop computer, or tablet. User interface system 118 communicates with building server 103 and/or unit server 105 over link 108 and supports system configuration operations, the presentation of system status information, and messaging.

Figure 2A:
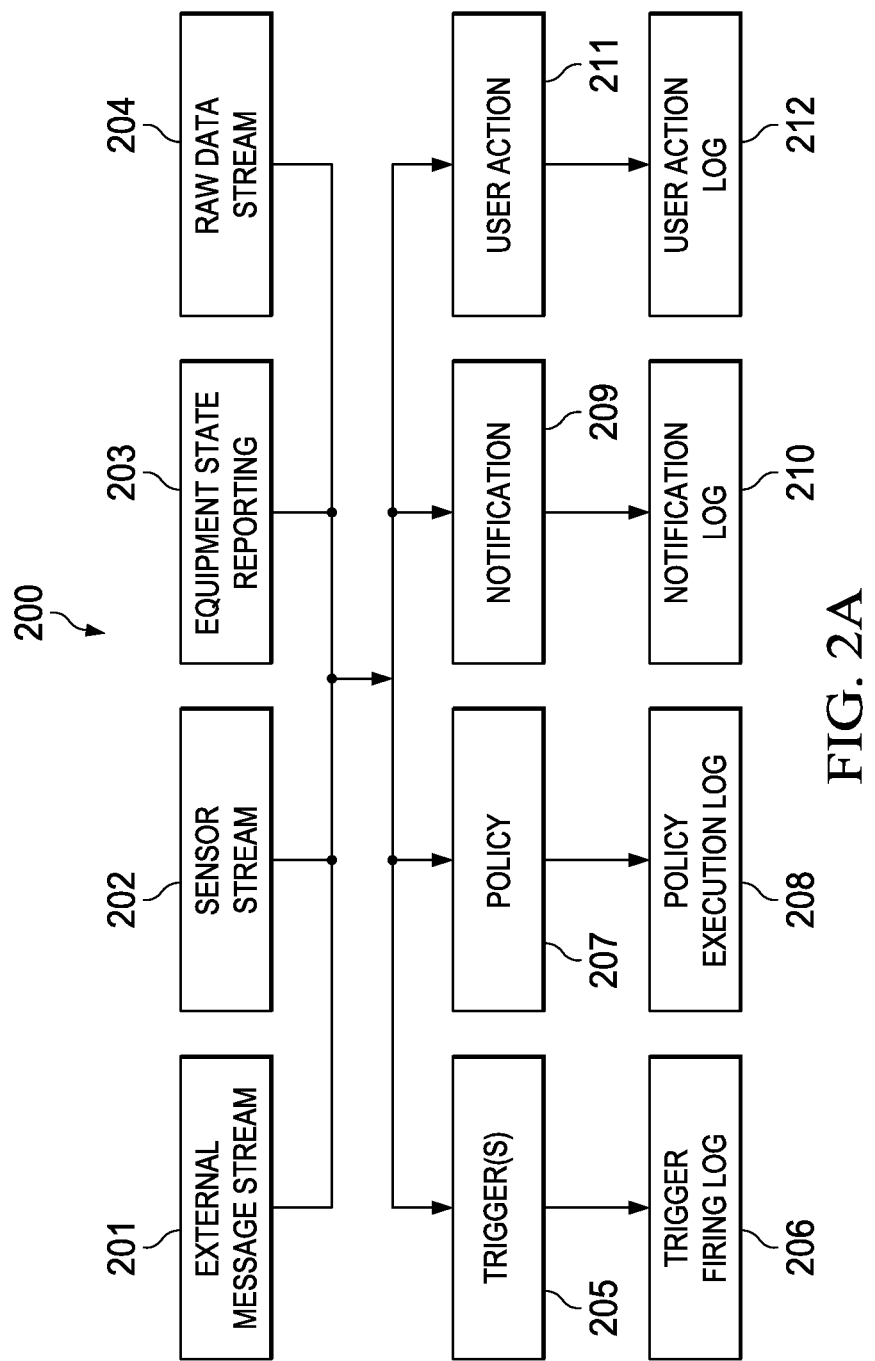
FIG. 2A is a block diagram illustrating a preferred information flow across the network of the risk management system of FIG. 1.

FIG. 2A is a conceptual block diagram graphically describing a preferred information flow in system 100. For purposes of the present discussion, the following definitions apply.

"Edge Subsystems" generically refers to the various subsystems within risk management system 100 having communications functionality (wireless or wired), and tripping circuitry and/or the ability to delegate tripping to another subsystem or device. In the illustrated embodiment the edge subsystems include smart plugs 111, equipment 112, pseudo-breakers 113, breaker panel 115, breaker panel controller 116, and breakers 117. Each edge subsystem also preferably includes dedicated sensing and monitoring components, which monitor its operating performance, local environmental conditions, and electrical parameters associated with its electrical connection to power distribution system 102.

Collectively the edge subsystems, external sensors 110, and internal sensors 114 provide a networked set of nodes for collecting information from various points around system 100. These nodes can exchange information among themselves, as well as with the higher levels of system (e.g., cloud service 100, building server 103, and/or unit server 105). As discussed further below, the network of nodes allows for local information to be collected at various points inside and outside the structure, such as equipment performance, environmental conditions, and electrical performance of electrical distribution system 120. In addition, the network of nodes and processing subsystems (i.e., cloud service 100, building server 103, and/or unit server 1051 provide redundancy allowing policies to respond to triggers in the most efficient manner, depending on the current state of system 100.

A "trigger" is one or more sets of conditions, states, measurements, or combination thereof, which trigger one or more actions by one or more subsystems, preferably with logging and notification. A "policy" defines one or more actions taken in response to a trigger to change the state of a subsystem, send a notification, or react to a non-response to a suggested human mediated action.

"Templates" are published and associated with a corresponding edge subsystem. Templates generally consist of Triggers, Policies, and Notifications. More specifically, Factory Default templates are published by the vendor or distributor of a given edge subsystem. Published templates are published by the vendor, distributor, or a third party and may vary from the Factor Default templates. User Default templates are created by the user or system administrator and may be associated with multiple edge subsystems. Edited templates are templates that have been modified over the original Factory Default or Published template. Published with Addition is a template that identifies alterations or edits that have been made over the original published template.

A "notification template" is set of notifications sent to a set of people with specified dynamic text, in response to a trigger or a recommendation. "Recommendation logic" is a set of rules for analyzing events, equipment data, sensor data, and external data at one or more locations.

"Delegation" means the allocation of a policy, trigger, notification, or recommendation to one or more other subsystems. "Breaker delegation" means a pseudo-breaker acting as a full breaker by delegating the trip function to one or more breaker-enabled devices such as a breaker embedded in a piece of equipment 112 or a breaker 117. A "prescription" is a set of conditions or states that if missing, not reported, not available, or falling outside acceptable measurement parameters, triggers at least one of a policy or notification.

"Spatial risk mapping" is the mapping individual risks for a particular region of a structure or risks across adjacent structures for the purpose of improving risk assessments, notifications and recommendations. Approaches used include estimation of damage and mapping of damage on a map, along with predicting timing of transfer or spread of fire or other problems. "Time Series and Analysis" means the analysis of data belonging to one or more machines of one or more users leading to summary information, modeling, or a recommendation.

As shown in FIG. 2A, the information stream flow includes an external message stream 201 sourced by cloud service 101, building server 104 and/or unit server 105. Sensor stream 202 includes information sourced by external sensors 110 and internal sensors 114. Equipment state reporting stream 203 includes information sourced from equipment 112 such as electricity usage, operational parameters, and state. Raw data stream 204 includes information sourced from smart meter 109, smart plugs 113, breakers 117, and breaker controller 116, such as voltage, current, power consumption, current overloading, over and under voltages, arc faults, frequency, noise, and ground faults.

These information streams are used to generate triggers 205 (logged at block 206), policies 207 (logged at block 208), notifications 209 (logged at block 210), and/or user actions 211 (logged at block 212), which allow for the mitigation of events or potential events detected by system 100 with regards to electrical distribution system 120 and its surroundings.

Figure 2B:
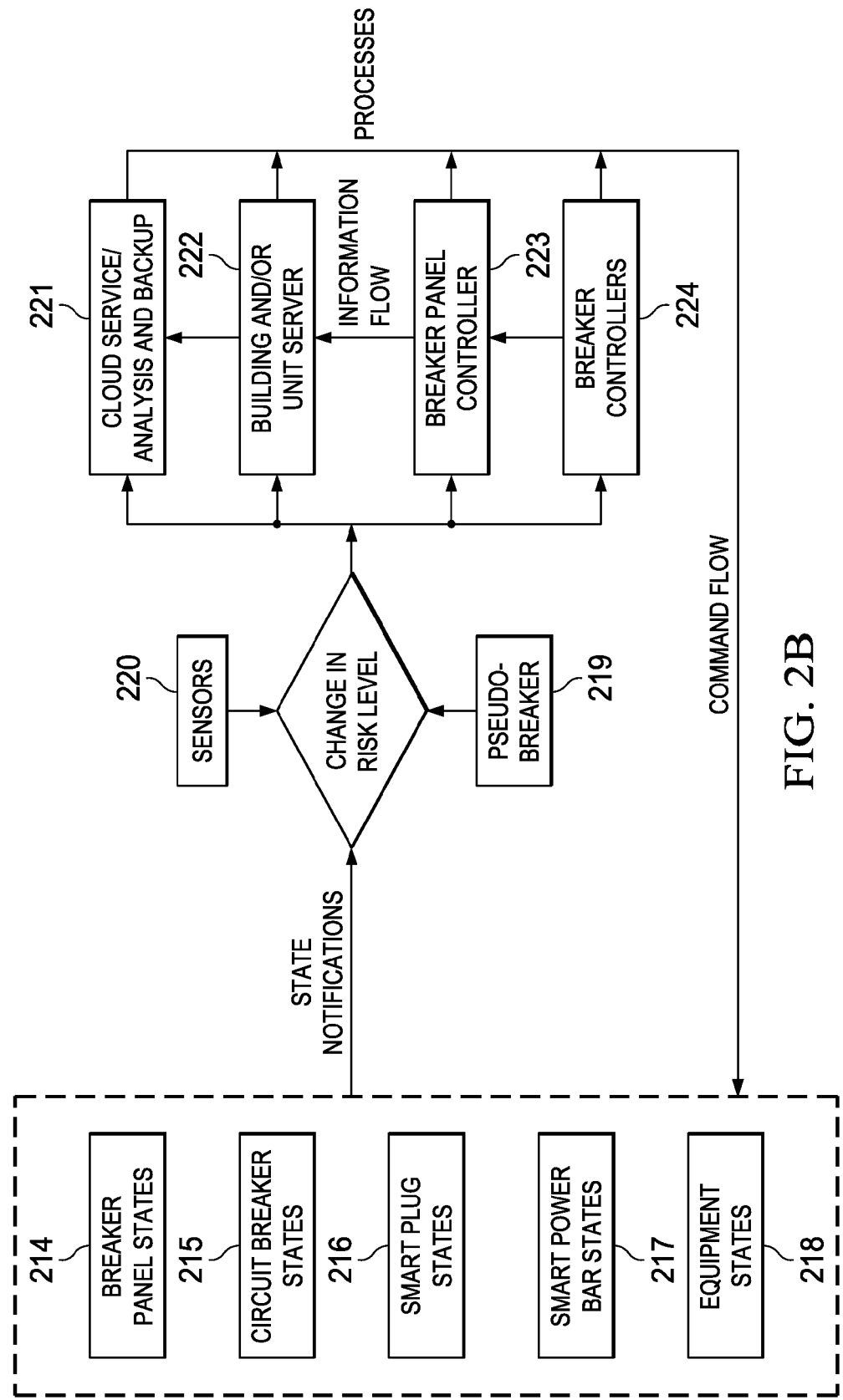
FIG. 2B is a more detailed block diagram showing the information flow between the hardware subsystems across the network of the risk management system of FIG. 1A.

FIG. 2B is a conceptual block diagram illustrating the network information flow and decision making process in the preferred embodiment of system 100. State notifications are derived from breaker panel state information 214 generated by breaker panel controller 116, circuit breaker state information 215 generated by circuit breakers 117, smart plug state information 216/smart power bar state information 217 from smart plugs 111, and equipment state information received from equipment 112. The state information is taken together with sensor information 220 generated by sensors 110 and 114 and pseudo-breaker information from pseudo-breakers 114 to detect any change in risk level.

The state notifications are evaluated by processes flexibly allocated between the processing and control resources available in the particular embodiment of system 100. The embodiment of FIG. 2B includes processes 221 executed by cloud service 101, processes 222 executed by building server 103 and/or unit server 105, processes 223 executed by breaker panel controller 116, and processes 224 executed by the controllers within the individual breakers 117. Command flow is then returned from one or more of these processes to smart plugs 111, equipment 112, pseud-breakers 114, and circuit breakers 117.

In the illustrated embodiment information flow is upward, from processes 224 executed at the lowest hardware level (i.e., breakers 117) to processes executed at the highest hardware level (i.e., cloud service 101). Information such as electrical consumption, fault, and spike information is locally recorded in each device (e.g., a smart plug 111, piece of equipment 112, pseudo-breaker 113, or breaker 117) as a storage buffer for use by that device in making fast decision making and policy execution. Present data is retained by each subsystem as they are transmitted upward through the system 100 hierarchy. Preferably, all of the collected information is uploaded to cloud service 101, building server 103 and/or unit servers 105 for analysis, storage of record, and backup. Advantageously, cloud service 101 is able to access information from multiple user accounts (e.g., apartment buildings, office buildings, individual residences), which provides a wider database for risk assessment.

FIG. 2C illustrates four exemplary classes of mitigation responses to various potential risks. In FIG. 2C, a change in risk level may be due to external notifications 225 concerning environmental conditions, received for example across cloud 102, and/or external notifications related to adjacent buildings for units received from external sensors 110. Electrical distribution system status information 228, subsystem information 229 (i.e., information from smart plugs 111, equipment 112, breaker panel controller 116, and breakers 117), and pre-lighting strike information 230 may all contribute to an assessment of the risk level, depending on the embodiment of system 100.

In the example of FIG. 2C, changes in the risk level can, depending on the policies implemented, cause one or more responses. First, a recommendation 231 can be made to the human user to change usage of an edge subsystem connected to electrical distribution system 120 (e.g., turn off one or more household appliances or industrial equipment). Second, a recommendation 232 can be made to the human user to take immediate mitigation action, such as disconnecting an appliance from a smart plug 111 or turning-off a piece of equipment 112. Third, one or more subsystems may initiate immediate action (e.g., turn off a branch 121 or shut-down a piece of equipment 112) and send a notification to the human user (Block 233). Fourth, one or more subsystems make take immediate mitigation action, send a notification to the user, and send an emergency alarm to first responders (Block 234). Fifth, a "two-phase commit" may be initiated where a warning is sent to a user or administrator indicating that a mitigation action must be taken within a particular time window, after which system 100 will automatically initiate the mitigation action.

Execution and control policies determine which subsystem in the hierarchy of system 100 executes a given mitigation and/or notification policy. Typically, different risk levels require evaluation and mitigation/notification policy execution at different levels within the system hierarchy. For example, a severe overload of one or more branch circuits 121 may require a hard trip and intervention by breaker controller 116, unit server 105, and/or building server 103. A less severe spike on a branch circuit 121 may only require a soft trip and breaker reset, which may be safely accomplished by the controller within the corresponding breaker 117.

The ability to process state notifications allow system 100 to provide an overall assessment of the reliability of a plug, outlet or connection to an appliance, device, or piece of equipment. For example, a smart plug 111 may consistently transmit state notifications that are associated with higher risk of fire or with actual fires. Similarly, an overall assessment of the status of a branch circuit may take into account state notifications representing arc and ground fault present status, a pattern or history of ground and arc faults and overloading, or pre-lightning indicators. A state notification from one subsystem (e.g., a sensor 110) may be used to support or change the assessment based on the state notifications from another device (e.g., a smart plug).

Mitigation functionality in the preferred embodiment of system 100 is mainly expressed through reusable Policy Templates that specify trigger events and measurements and the resulting mitigation actions. For example, in an automatically fired policy 207 (FIG. 2A), an action (e.g., tripping a breaker 117) will automatically occur upon the corresponding trigger 205. In a two-stage recommendation policy 207, the first stage in response to a trigger is a recommended human user action 211 (e.g., manually trip a breaker 117), which if not performed or denied approval within a specified time interval is automatically executed (e.g., the appropriate breaker 117 is automatically tripped). Other policies 207 may result in a recommendation on usage in response to a given trigger, such as disconnecting one or more edge subsystems, checking the circuit wiring, changing edge subsystem usage and/or the time of day of edge subsystem usage.

Advantageously, mitigation can be implemented at different levels of the system 100 architecture, depending on the severity of the risk and the ability to isolate the triggering events. In the illustrated embodiment, mitigation can be implemented by cutting-off electrical flow at smart meter 109, at breaker panel 115, at the individual breakers 117 (for both hard and soft trips), at smart plugs 111 (either individually or collectively as a power bar), or at the individual pieces of equipment 112.

With regards to the detection of arc faults, ground faults, and pre-lightning strike conditions by breaker panel controller 116 and breakers 117, a typical policy might include issuing commands for cutting off all electricity to the building, reducing the voltage to the building, managing electricity on a branch circuit 121 basis, resetting branch circuits 121 tripped for poor reasons, and/or suppressing usage of a high risk branch 121.

As another example, if a breaker 117 detects a pattern of overload or overheating in a branch circuit 121 (e.g., the trigger 205), then the policy may dictate different actions be taken depending on the severity of the conditions. For example, at high levels of overload or overheating, individual breakers 117 may be programmed or commanded to trip to reduce heat and likelihood of fire. On the other hand, at low levels of overload or overheating, recommendations may be transmitted to the user or other decision maker able to check the branch circuit, an edge subsystem connected to the branch circuit 121, and/or to disconnect an edge subsystem from the branch circuit 121 immediately. Given that a pattern of overheating or overload may reverse after a branch circuit is switched off or as a result of a change in load on the branch circuit, the recommendations may include a recommendation not to use the branch circuit 121 until checked, despite a satisfactory status report from the circuit breaker 117 or circuit breaker controller 116.

The policies and decision rules conversely can recommend the replacement of one or more of sensors 110 or 114, wiring, breakers 117, appliances and equipment 112 where a pattern of false positives has been identified either automatically or through human intervention.

For example, when a smoke detector 114 detects a high level of smoke, a typical policy might initiate a fire alarm to produce a sound to notify any occupants, trigger another sensor which can pick up the sound and send a message, send an SMS to any occupants, and/or our send a notification to building security, fire department or other relevant stakeholder.

Similarly, when an external sensor 110 or an internal sensor 114 detects water flooding, preventive actions taken to minimize impact of flood damage caused electrocution and shorts may include cutting off individual branch circuits 121 with breakers 117, or shutting-off electrical distribution system 120 in its entirety using smart meter 109 or breakers 117. In addition, the executed policy may require the transmittal of a command or recommendation for the shut-off of the main water supply or a particular water distribution control. (The same is true for the detection of a gas leak, which may dictate the shut-off of the gas supply and/or the shut-down of smart plugs 111 or equipment 112 in the vicinity of the leak).

Decision rules can be simple or based upon data about individual pieces of equipment 112 or about individual branch circuits 121. External sensors 110 particularly allow for the evaluation and mitigation of risk presented by adjacent properties.

Negative information is addressed with Prescription Templates. A prescription is a particular set of conditions for a set of subsystems over a designated period of time that if deviated from generates a trigger 205 and a corresponding combination of Notification 209 and Policy 208 execution. The set of conditions may be made conditional on other information generated within system 100 or received from an external source. Some embodiments may include a reference prescription policy created or provided by third parties, utilities, service providers, contractors, building inspectors with recommended or mandated notification policies. Administrator override is permitted if the Prescription Policy originator is notified.

A typical Prescription Template might be used in situations where there is policy non-compliance by a subsystem, no state notifications are being transmitted from a subsystem, monitoring of a subsystem is inadequate, or no policies are set for a given set of conditions. A prescription may trigger a remedial policy, such as manual repair, manual repair plus automatic repair after specified elapsed time, or emergency first responder notification. A Prescription Template may also require notification of a human user that the identified condition is not being not being met, as well as log the prescription for subsystem maintenance, further analysis, pattern analysis and recommendations about settings and policies.

Notification Templates, specify who should be notified in the event that a particular policy 207 is triggered.

Preferably, Notification Templates are tailored to send notifications to those parties requiring information within a given time period after the processing of a trigger. In other words, the extent and urgency of the transmission of notifications will depend on the detected risk. Among others, notifications may be sent to occupants of a unit or building and occupants of adjacent units and buildings also at risk. Notifications may also be sent to building management, building and property owners, the electric or gas utility company, and first responders such as police, ambulance providers, fire departments, and local hospitals. The owners, service providers, and contractors using or maintaining and edge system may also be notified such that repairs can be made and failure analysis performed. Similar information may be sent to original equipment vendors and resellers. Furthermore, notifications may be sent to others having a personal or property interest that could be adversely affected by the triggering event.

Hence, a typical notification template will identify the event type (e.g., electrical, fire/smoke, flooding, earthquake, carbon monoxide, carbon dioxide, and so on), by a representative code or by full text. The notification template may also identify the risk level associated with the event. In accordance with the Notification Template, one or more actions are taken, such as: (1) email or text message a standard format notification text to the appropriate stakeholders based on the event and its severity; (2) send an email or text message recommending an action, a recommended time period for taking such action, and indicating any next steps that will be taken if the recommended action is not taken; (3) place a notification telephone call; or (4) place a 911 emergency call with voice notification of the event. Each notification may also include an indications as to whether first responders have been notified, whether adjacent property owners and individuals have been informed, and/or whether an individual or first responder has taken remedial action.

It should be recognized that the control and notification policies, at least in some embodiments of system 100, may also be used for more general electricity management tasks, in addition to risk management and mitigation. For example, system 100 can interface with home energy management systems (HEMs), home automation systems (HASs) using API or messaging through a home network or cloud integration.

Among other things, control and notification policies can established that trigger different electricity use profiles, thereby allowing the more efficient and less expensive use of electricity. For example, control and notification policies can be set up to send recommendations to a home owner to implement a smart home usage profile, which might include recommendations for settings on equipment, appliances, circuits, and smart plugs. In addition, policies can be set up for automatically cutting off electricity to a location, building, or unit, cutting-off a particular branch circuit, or switching-off a plug outlet or device under given conditions, such as during brown-outs or similar periods of high demand.

System 100 also addresses concerns about when electricity is in use and confirms to users when electricity should be in use. One example is where a piece of equipment 112 includes an electric vehicle charger. In this case, a user can remotely confirm that the charging of batteries is occurring, even when physically distant from the electrical battery being charged.

Triggers, policy templates, notification templates, and prescription templates are preferably set by cloud service 101, building server 103 or unit server 105, but their execution is delegated to smart plugs 111, breakers embedded within equipment 112, or breakers 117. For example, building server 103 may set a two-stage recommendation policy for a piece of equipment 112, which then detects the corresponding trigger, generates an indication to the user, and then trips an embedded breaker when no user action is taken within a specified time interval. Similarly, a pseudo-breaker 113 detects a certain condition and then delegates tripping to the appropriate breaker 117. Preferably, the lower level subsystem receiving the delegation reports back the results of the delegation (e.g., the execution of a policy) to the delegating higher-level subsystem.

Hence, policy execution in the illustrated embodiment of system 100 can advantageously can occur at the device level (e.g., by smart plugs 111, equipment 112, pseudo-breakers 113, or breakers 117), at the controller level (e.g., by breaker controller 116, smart meter 109), or at the higher system levels (e.g., by unit server 105, building server 103, or cloud service 101). Under this hierarchy, if a lower-level subsystem fails, responsibilities are transferred upward. For example, if all the subsystems within system 100 are controlled by building server 103, which fails, then control can be transferred to another locus, such as cloud service 101. Similarly, if breaking fails at the level of smart plugs 111, breaking can be transferred to the circuit level by breakers 117 or breaker controller 116, and if circuit level breaking fails, breaking can be transferred to smart meter 109.

Table 1 illustrates a number of exemplary triggers, representative subsystems invoked in sensing each trigger, possible actions taken in response to the trigger in accordance with the associated policy, possible notifications generated in response to the trigger, and possible analytics performed in response to the trigger, the action taken, and the notifications generated. In actual embodiments of system 100, the triggers, policies and notifications generated will depend on the hardware configuration (e.g., the number and type of sensors 114) and/or the selections made using the policy and notification templates.

A preferred set of recommendations and actions are shown in Table 2, along with subsystems invoked in processing the corresponding signals and data necessary to trigger those actions and recommendations.

The use of policy templates provides the user or administrator with significant flexibility in addressing various detected conditions. Although not exhaustive, Table 3 illustrates a number of representative alternative actions that can be taken in response to specific conditions detected by system 100. The alternatives may be implemented automatically by one or more subsystems, may require notification and active action on the part of a human user or administrator, or may be implemented automatically if a human user or administrator is notified, but takes no action within a specified period of time.

The notification templates are preferably set in response to various needs or use cases (e.g., fire prevention) and corresponding factors (e.g., smoke detector responses and circuit temperatures). Table 4 illustrates a number of use cases during which notifications could be generated, depending on the needs of the user and the configuration of system 100, along with various factors that could be considered in setting up the corresponding notification template.

Triggers, as well as policies, may be automatically updated in response to analytics performed by one or more of cloud service 101, building server 103, and unit server 105. More specifically, the significant amounts of data collected from external sensors 110, internal sensors 114, and the edge equipment, along with analytics packages running on cloud service 100, building server 103, and/or unit server advantageously support adaptive update of the triggers and policies to address conditions to which the user of system 100 may not be aware or able to timely respond.

Each subsystem within system 100 has a composite status, based on the status of various actions taken or being taken at a given instance (e.g., an event has occurred and automatic mitigation has been executed by that subsystem). The capabilities and limitations of a given subsystem, as well as its setup and security, must be accounted for in evaluating the overall risk to the structure being protected by system 100. In the illustrated embodiment, the ability of a given subsystem to monitor, detect, and respond to a given hazard under present conditions is given a risk level score on a 100 point scale (e.g., building server 103 is operating at a certain capacity or a sensor 114 has limitations on its ability to detect certain conditions under certain circumstances). For subsystems requiring setup, a 100 point setup score on a 100 point scale is assigned, which represents the ability of the subsystem under the current setup to monitor, detect, and respond to events under that setup (e.g., the subsystem is presently setup for low-power operation). Finally, for subsystems with variable security settings, a security and permissions setup score on a 100 point scale is assigned to account for the present ability of the subsystem to withstand modification or tampering. Calculation of an overall risk score is discussed further below.

Table 5A illustrates a preferred set of possible states for cloud service 101, Table 5B for building server 103 and unit server 105, and Table 5C for the network management function running on building server 103 and/or unit server 105. A general set of preferred states for smart plugs 111, equipment 112, pseudo-breakers 113, breaker panel 115, and breakers 117 is shown in Table 5D. Table 5E provides a preferred set of states for sensors 110 and 114 and Table 5F sets out a preferred set of states for mobile device 122.

In embodiments of system 100 having multiple sensors 110 and 114 and multiple reporting devices, such as smart plugs 111, pseudo-breakers 113, breaker controller 116, and breakers 117, multiple nodes may detect an event or conditions associated with an event. Table 6 illustrates exemplary scenarios where a first information source detects a potentially hazardous condition (e.g., an arc fault), while a second information source detects a second condition (e.g., a ground fault), which could increase, or potentially substantially increase, the risk of a hazard to the structure and/or its occupants.

From information received from three sources (e.g., external sensors 110, internal sensors 114, sensors within breakers 117) the ability to evaluate risk is further enhanced. For example, the probability of hazardous conditions requiring mitigation will be very high if three sources respectively report an arc fault, a ground fault, and increased circuit temperature. Other examples include the reporting of an arc fault, increased circuit temperature, and smoke and fire and the reporting of a ground fault, increased circuit temperature, and smoke and fire.

An example of four source reporting is the reception of an earthquake notification (e.g., via cloud 102), ground movement detection by a local sensor, natural gas detection by a local sensor, and a ground fault detection. A representative five source reporting would be the notification of an earthquake, local ground sensor detection, local natural gas detection, an arc fault detection, and a ground fault detection.

System 100 preferably implements a permission model to permit control, reporting and changes to triggers 205, policies 207, and notifications 209 only with high level authorization (often referred to as an administrator status). Different levels of access and control e.g.) (time periods, equipment scope, level of authorization) can be specified including privileged Administrator access for first responders in emergency events. Additional security features may include encryption, two factor authentication, and different levels of device registration. In some versions, a dollar value of policy consequences and permissible risk changes may be used to determine permissibility of a user's changes to the system.

With the proper permissions, mobile applications running on mobile device 122 are provided for controlling one or more edge subsystems, interrogate, obtain information, set policies and notification events through a number of entry points into system 100, such as cloud service 101, building server 103, unit server 105, or individual devices having wireless communications capability, such as breaker panel 115.

Triggers and the invocation of control and notification policies provide an information base for analysis, for example, by cloud service 101. The results of such analysis is useful not only for reducing and mitigating risks associated with the structure associated with system 100, but also for adjacent and similar structures.

User interface 118 supports the local display of information regarding the operation of system 100. For example, in the illustrated embodiment of system 100, user interface 118 provides visual displays of notification vectors, log and action status, electrical distribution system 120 activity, logs of alarms, logs of policies triggered, logs of notifications, and logs of automated action, among other things.

Figure 3:
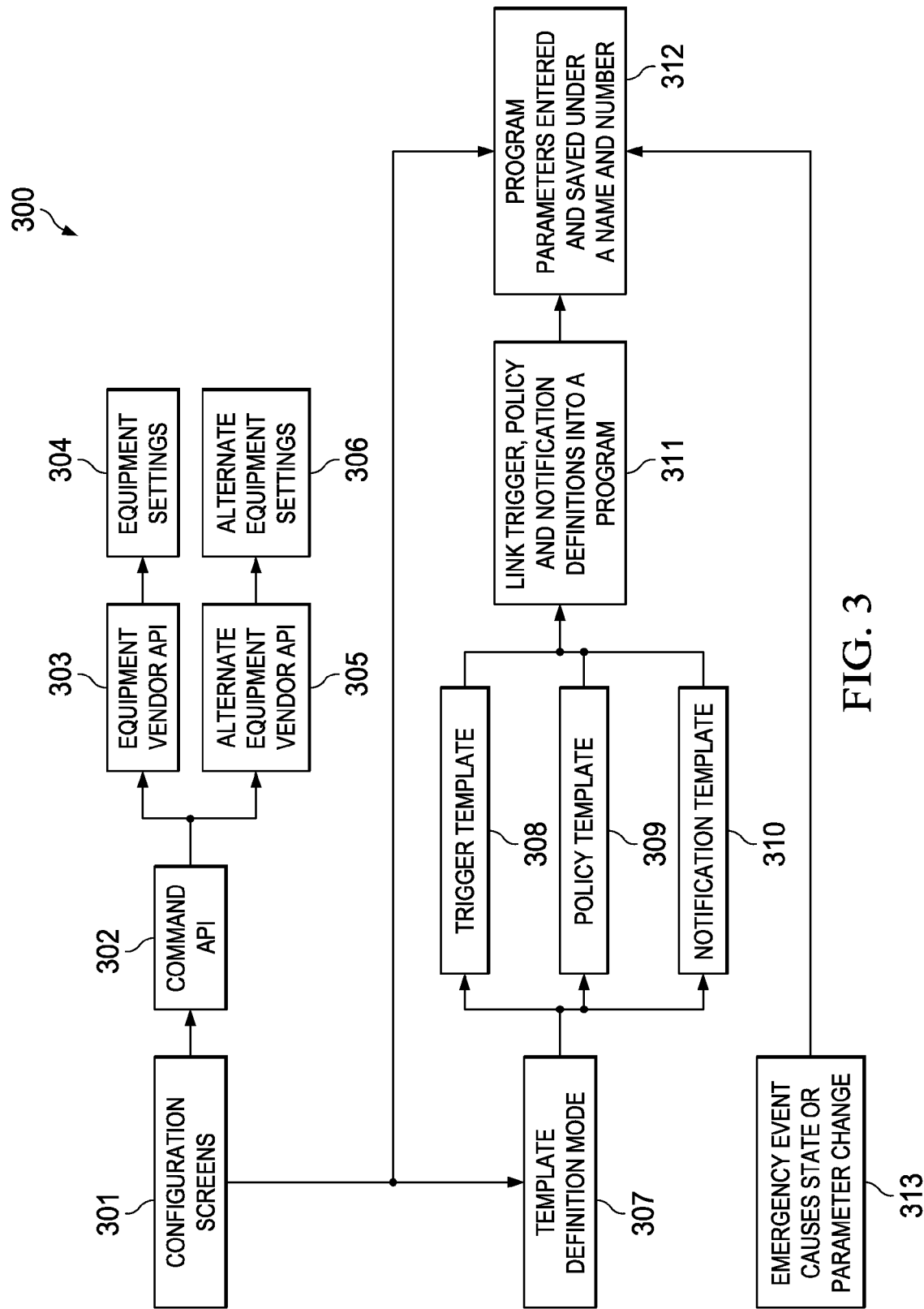
FIG. 3 is a flow diagram illustrating a preferred information flow between various hardware components of FIG. 1A during system configuration.

FIG. 3 is a block diagram illustrating the configuration of system 100 through screens presented on user interface 118 of FIG. 1. Specifically, the user or administrator of system 100 uses configuration screens 301 on user interface 118 to invoke a command applications programming interface (API) 302, running, for example, on building server 103 or unit server 105. Command API 302 communicates with subsystem vendor API 303 associated with a vendor providing one or more subsystems including external sensors 110, smart plugs 111, equipment 112, pseudo-breakers 113, internal sensors 114, breaker panel 115, breaker panel controller 116, and breakers 117. Through the configuration screens, command API 302, and vendor API 303, the system 100 user or administrator is able to set various settings 304 for the given subsystem.

The user or administrator similarly configures a subsystem provided by a second or alternate vendor through alternate subsystem vendor API 305 and configurable settings 306.

In addition, the system user or administrator can enter a template definition mode 307 through configuration screens 301. In the template definition mode, the user or administrator creates one or more trigger templates 308, one or more policy templates 309, and one or more notification templates 310, as described above. Depending on the embodiment of system 100, this may be achieved through the display of a template list, the selection of a type of template (e.g., policy, notification, prescription), from the list and the selection of a specific template from the set of the selected type of templates. Following selection of the specific template, the library for the template is displayed and an item from the library selected to populate the template. The populated template is finally saved under the template name. For one or more notification templates, the notification template is attached to a policy name and/or may be cloned for a list of policies.

The created templates are then linked to a program 311, discussed further below. The program parameters 312 are entered and saved under a name and identification number.

An emergency event causes a state or parameter change 313, as discussed above, which is then presented to program 312 and processed as a trigger in accordance with the policy and notification templates setup during system configuration.

Some of the specific operations that a user or administrator can implement through user interface 118 during system 100 configuration include specifying the addresses and operating parameters for smart plugs/smart power bars 111, equipment 112, pseudo breakers 113, breaker panel 115, breakers 117, and branch circuits 121. In addition, using interface 118, the user may also specify the edge subsystems connected to a given branch circuit 121, attach plug information to edge subsystems, and specify sensors 114 by room or unit.

Table 7 sets out a preferred set of configuration and functionality options ("epics") for system 100, including its edge subsystems. In addition, Table 8 sets forth a preferred set of operations that can be performed during use of system 100 through user interface 118 or mobile device 122.

System 100 may be configured to display, through user interface 118, graphical information, such as maps of branch circuits 121 and room (unit) maps, including sensor 114 locations. Through user interface 118, a user with proper permissions may access an information source library, add an information source to the library, select an information source from the library, attach an information source to one or more policies, and edit information source policies.

Figure 4:
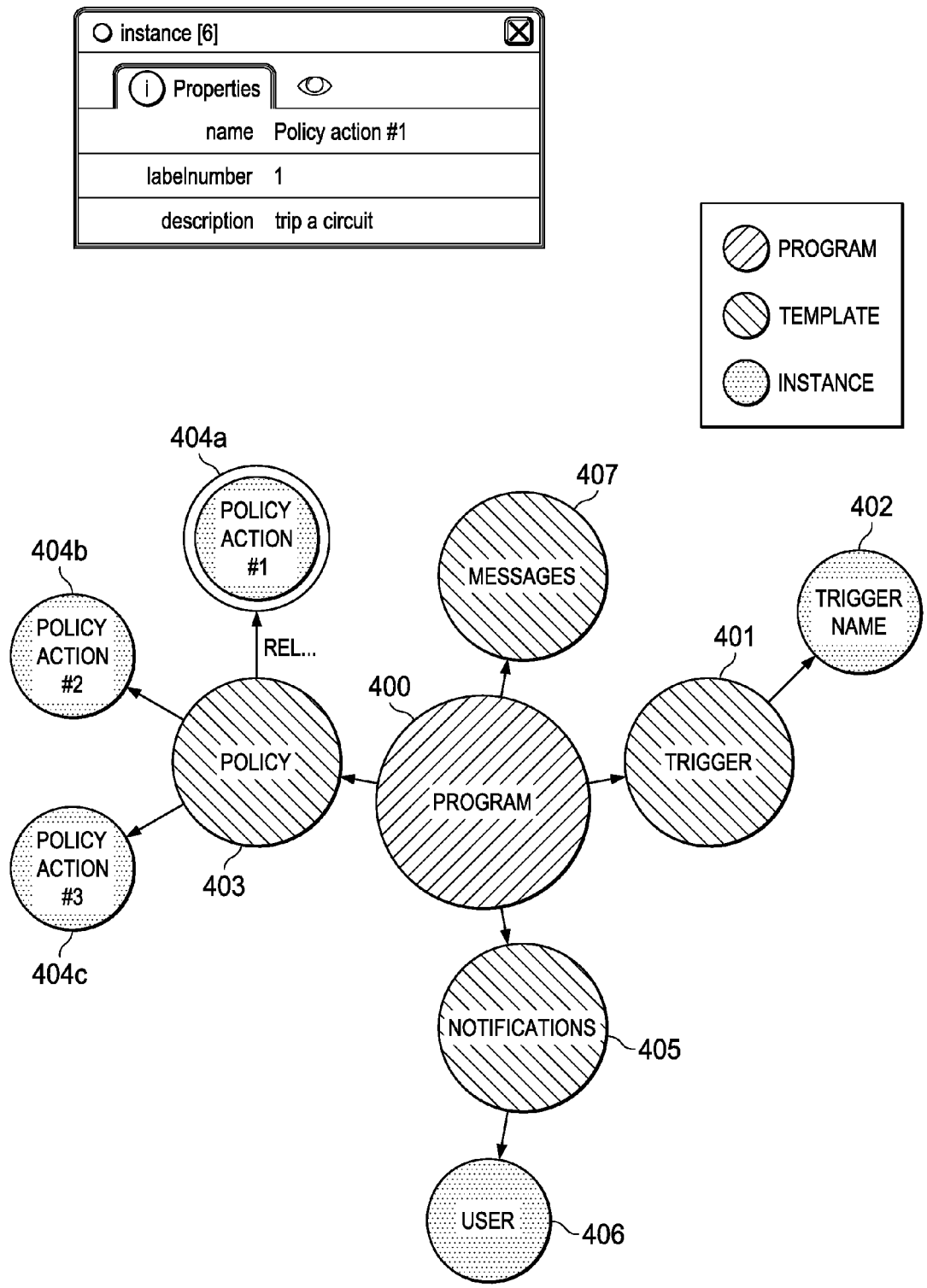
FIG. 4 is a diagram showing the interrelationships between triggers, policies, policy actions, notifications, users, and messages controlled by the software program of the risk management system of FIG. 1A.

FIG. 4 is a diagram graphically summarizing the relationship between certain key functions of system 100. A program 400 consists of one trigger 401, at least one policy 403, and at least one notification 405. Each trigger is associated with a trigger name 402 and each policy is associated with one or more policy actions, which are represented in this example by policy actions 404a-404c. Notifications 405 provide information to a user 406.

A specific "published program" is a program 400 associated with the parameters attached to a particular subsystem within system 100. A subsystem may be associated with multiple programs 400 and a program 400 can draw upon triggers 402 associated with multiple sources of information or subsystems.

In general, the preferred embodiment of system 100 operates on information including: (1) electrical consumption information from smart meter 109 (e.g., at one second or specified intervals providing greater detail than a typical smart meter); (2) spike information measured by smart meter 109 for short periods of time (e.g., less than a minute, where electricity usage is collected at smaller units of granularity, such as milliseconds or other specified shorter time periods); (3) state information about a particular subsystem, its policies, parameters and configuration; (4) electrical system architecture information, such as parameters and addresses for edge subsystems and electrical apparatus installed in and/or linked to edge subsystems such as smart plugs 111, equipment 112, pseudo-breakers 113, breaker panel 115 and breakers 117; (5) sensor data feeds from non-electrical system sensors 110 and 114; (6) log information that logs events, triggers, policies executed, notification sent, user responses to two phase actions, changes in triggers, policies, and notifications; (7) user directory with security levels, permissions, contact information, links to programs (named and numbered triggers, policies, notification templates); (8) network availability, policies, priorities, encryption, permissions, and so on; (9) adjacency information (i.e. information about location and status of nearby units, buildings or transportation that might have impact upon the building and its risks; and (10) external source information (e.g., USGS earthquake notification, NOAA extreme weather notification).

System 100 may employ one or more known databases suitable for managing the various types of information required. In the preferred embodiment, system 100 employs two different databases. In alternate embodiments, the number and types of databases may vary depending on the particular system needs and configuration.

The first (electricity) database is focused upon handling the ongoing stream of electricity consumption data. Data are input into the first database either by polling the edge subsystems) or by direct feed from the edge subsystems. Preferably, the first database can handle data with varying degrees of granularity (e.g., milliseconds, seconds, minutes, hours, days, weeks, months, years, and so on).

Data from the electricity database are then passed to a graph database. Generally, a graph database consists of nodes (e.g., subsystems) and the relationship between nodes or sources of data used by each node. In alternate embodiments, the graph database is populated by information received directly from the edge. Advantageously, the graph database may be used for summary information or for investigation of data.

The graph database preferably contains complex information in addition to the time series information. For example, the graph database may contain information associated with the hierarchy of electrical distribution system 120 (i.e., smart meter 109, breaker panel 115, pseudo breakers 113, smart plugs 111, and smart equipment 112. The graph database may also contain information about the structure location, rooms or units within the structure, equipment without telecom or breaker functionality, and sensors and controllers for non-electrical systems such as water and gas.

Among the functions of the graph database are the maintenance of the addresses of the subsystems of risk management system 100, subsystems of electrical distribution system 120, sensors and other equipment for tracking purposes.

Other data storage includes lists of inhabitants and pets, which allows for tracking who has left the building in the event of an emergency, logs of edge subsystems status, commands issued and received, notifications sent and sensor values, relationships with weather and other warning services, and prescriptions.

The databases needed for the particular embodiment of system 100 may be established and maintained on cloud 102, or may be established locally, and maintained by building server 103 and/or unit server 105. In one particular embodiment of system 100, cloud service 100 also manages the storage of the templates associated with the subsystems of system 100, and the electrical apparatus linked to those subsystems.

Some exemplary databases, which may be used in system 100, include a graph database, such as the Neo4j graph database, for managing data representing the electrical distribution system 120 and the various subsystems of system 100. This, in general, a graph database has the significant advantage of being very suitable for representing hierarchical or inconsistent combinations of edge subsystems and circuits is schema-less, which permits dynamic changing of the system 100 structure on an ad hoc basis for adds and subtractions of subsystems. In addition, a graph database provides the ability to manage data in buildings or units of buildings with different electrical distribution, networking and sensor architectures.

An SQL database, such as a Postgress SQL database, is suitable for the logs. Time series analysis may be implemented using Mango or similar tool, as configured for monitoring sensor data. In addition, various known graphical tools may be included for automated representation of the structure and electrical system 120 on user interface 120.

Figure 5:
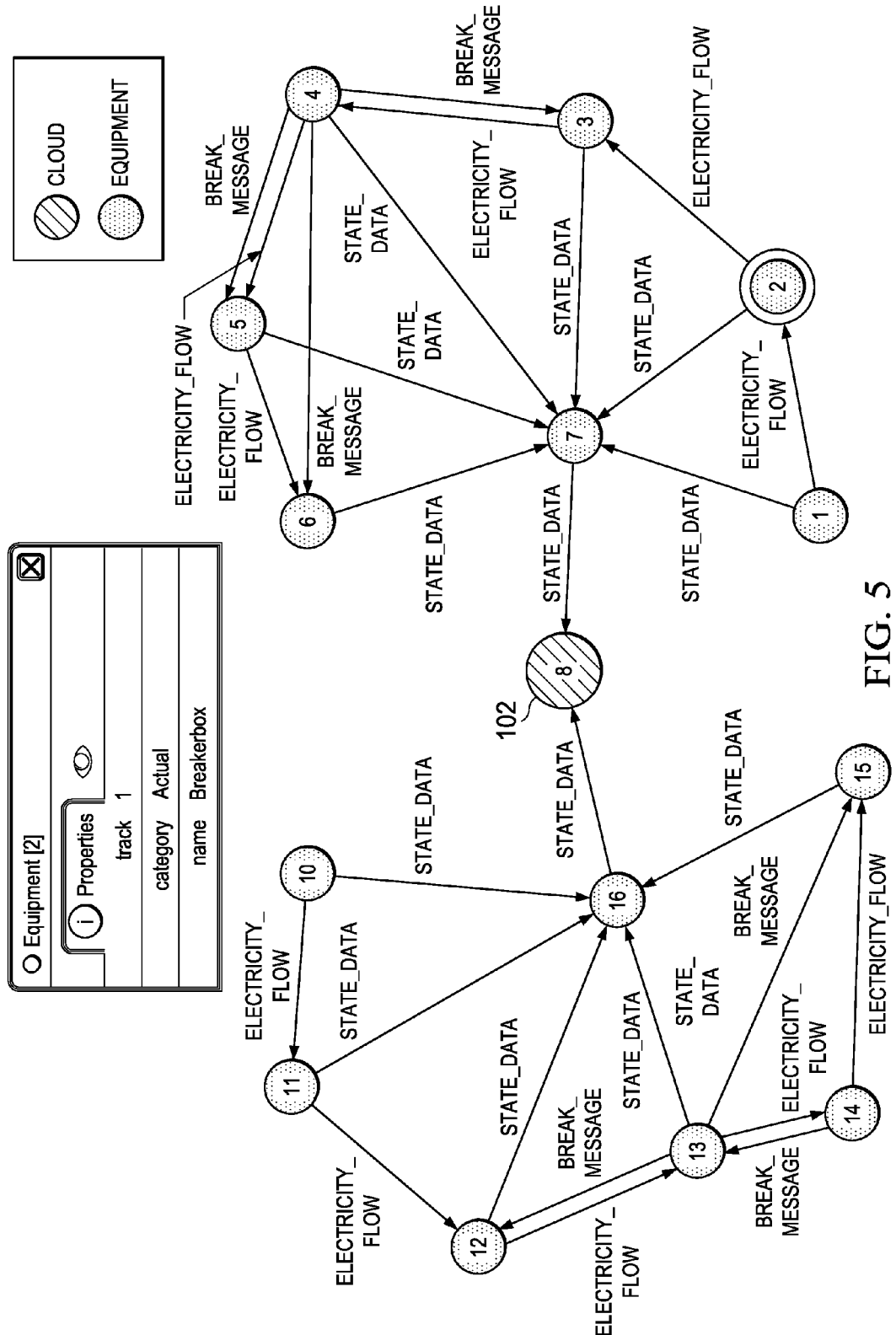
FIG. 5 depicts an exemplary graph database showing electricity flow to the structure of FIG. 1A and the reporting of state data.

FIG. 5 depicts a representative graph database showing how an implementation of system 100 can operate on either actual data from actual edge subsystems connected to an actual electrical distribution system or from test data from a test bed simulating edge subsystems and an electrical distribution system. More specifically, the left-hand network shows simulated electricity, state data, and messaging flows generated by a test bed and the right-hand network shows electricity, state data, and messaging flows generated by actual edge subsystems and an actual electrical distribution system. In each case, data are reported to a centralized node on cloud 102. (FIG. 5 does not show electricity usage or spike/arc information being flowed up to a server (e.g., building server 103 or unit server 105) or cloud as this is assumed to be a separate reporting path.)

Table 9 sets out a representative data model in terms of graph database objects for one particular exemplary embodiment of system 100.

Figure 6:
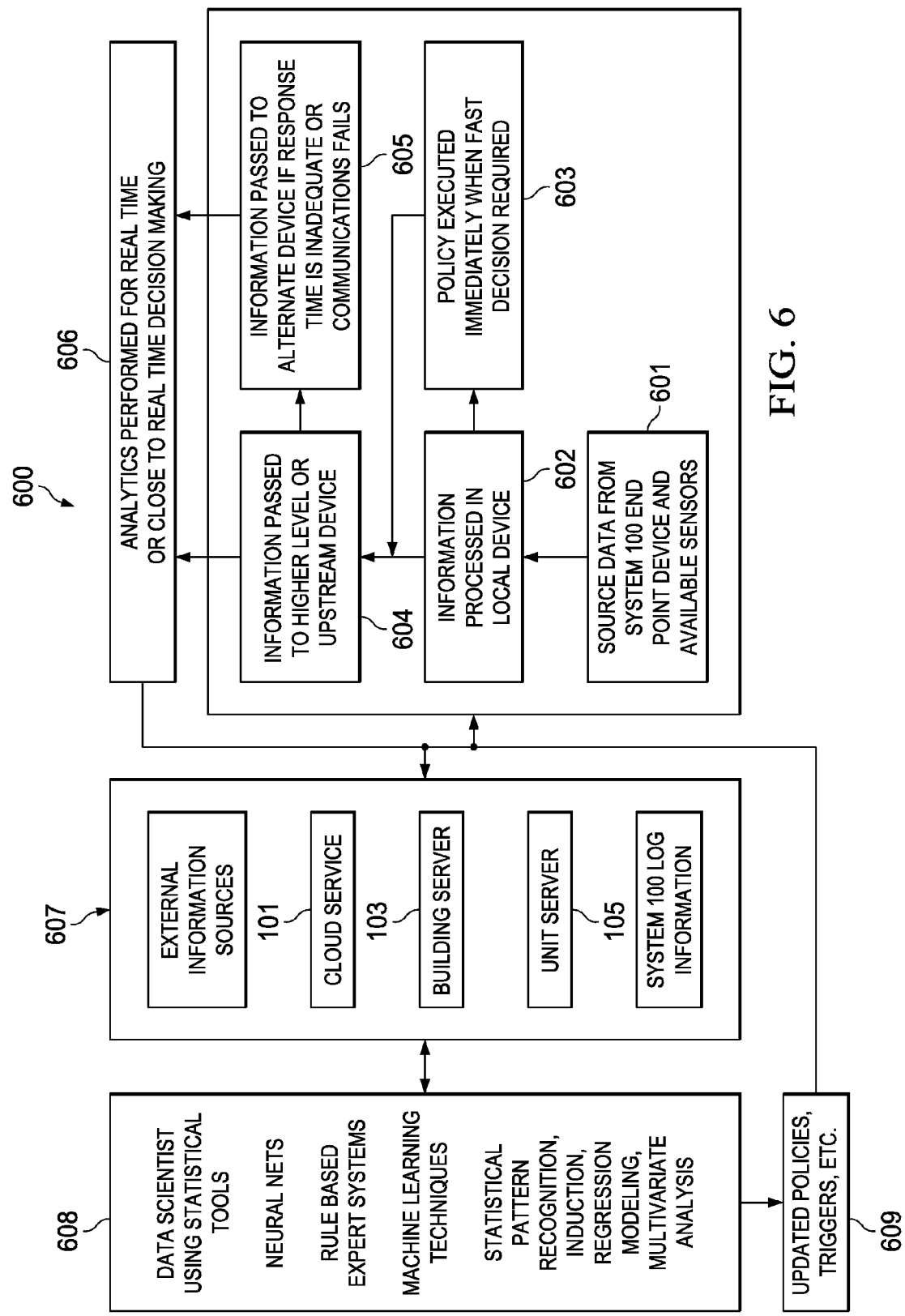
FIG. 6 is a flow diagram illustrating an exemplary process for training the risk management system of FIG. 1A.

Depending on the particular embodiment of system 100, policies, triggers, electrical spike identifications, and so on, may be updated in different ways, including automated, human, and hybrid approval processes. An exemplary updating process is shown in example is shown in FIG. 6.

At Block 601, source data are collected from various end points within system 100, such as smart plugs 111, equipment 112, pseudo-breakers 113, sensors 110 and 114, breaker panel 115, and breakers 117. The collected information is processed, at Block 602, by the local processing device (e.g., the controllers internal to smart plugs 111, equipment 112, pseudo-breakers 113, breakers 117, and breaker panel controller 115).

Depending on the result generated by the local processing device, a policy may be executed immediately by the local processing device, when an urgent action is required (Block 603). Otherwise, at Block 604, the information is passed to a higher level or upstream subsystem (e.g., from a breaker 117 to breaker panel controller 116, or from breaker panel controller 116 to unit server 105). If the response time from the next highest processing device in the hierarchy is inadequate or the communications fail, at Block 605, then the information is passed to an alternate subsystem (e.g., from a breaker 117 to unit server 105).

At Blocks 606 and 607, analytics are performed in real time, or close to real time, for decision making. As discussed above, analytics are preferably executed by cloud service 101, although they could also be executed by building server 103, unit server 105, or an external processing system. In executing analytics, a number of information resources may be invoked, as shown in Block 608. Exemplary information resources include, a human data scientist using statistical tools, neural networks, machine learning techniques, rule based expert systems, statistical pattern recognition, induction, regression modeling, and multivariate analysis. (Commercially available tools include Angoss Knowledge Seeker and BeyondCORE).

Generally, the goal is to establish relationships between pieces of information and prioritize the most significant relationships. The analysis of the relationship between various pieces of data advantageously helps increase the accuracy of determining when conventional equipment or apparatus (i.e., without communications capabilities) are attached to the network. For example, signal processing of information on the variation in electricity spikes can be associated with information about equipment attached to circuits, regions of circuits, plugs, smart power bars, and inventoried equipment attached to the network. Deterioration in equipment energy efficiency can also be identified with such approaches.

Based on the results of the analytics, policies, triggers, notifications, and other system 100 parameters are updated at Block 609.

Potential policies can be run in test in parallel to actual policies, using a test bed feature. The test bed functionality provides a virtual representation of the actual system including virtual versions of system 100 and electrical distribution network 120. Elements of the virtual system 100 and/or virtual electrical distribution network 120 can be changed, e.g. parameters, policies, source data, etc., for testing purposes. The testbed information can be edited, saved, duplicated, etc. and published to the operating system 100 when approved by administrator. (The test bed functionality is shown in the left-hand network of FIG. 5).

The presentation of data on user interface 118 and mobile device 122 can vary from embodiment to embodiment of system 100. FIGS. 7A-7E provide examples of possible graphical user interfaces for reference.

Figure 7A:
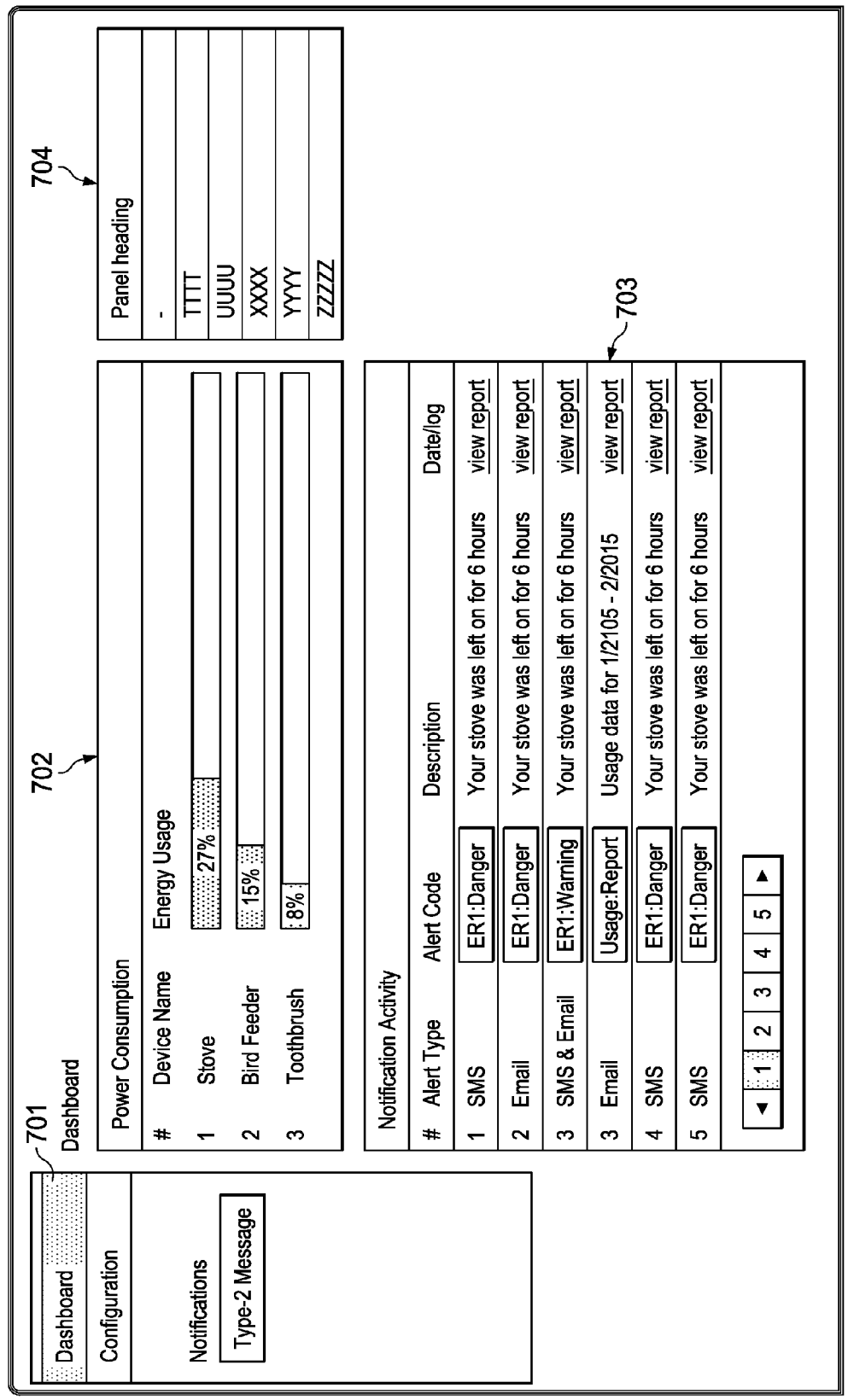
FIG. 7A illustrates an exemplary high level dashboard presented on the user interface of FIG. 1A.

An exemplary dashboard 700 on the display of user interface 118 is shown in FIG. 7A. A panel 701 allows the user to switch between dashboard 700 and a configuration window. Panel 701 also indicates that a Type-2 notification (discussed below) has been issued.

Window 702 provides information concerning the power consumption by the subsystems and edge apparatus connected to electrical distribution system 120. Notification activity is indicated in a panel 703. In the example of FIG. 7A, notification panel 703 indicates the type of alert sent (e.g., SMS, email, or both), the alert code (i.e., the urgency of the notification, such as informational, a warning, a danger), a description of the triggering event itself (e.g., stove left on for 6 hours), and a link to the information log associated with the notification. A further panel 704 may be provided for presenting additional information, as required.

A representative configuration dashboard 705 is shown in FIG. 7B, which allows for the input of configuration data as discussed above in conjunction with FIG. 3 and Tables 7 and 8.

Figure 7C:
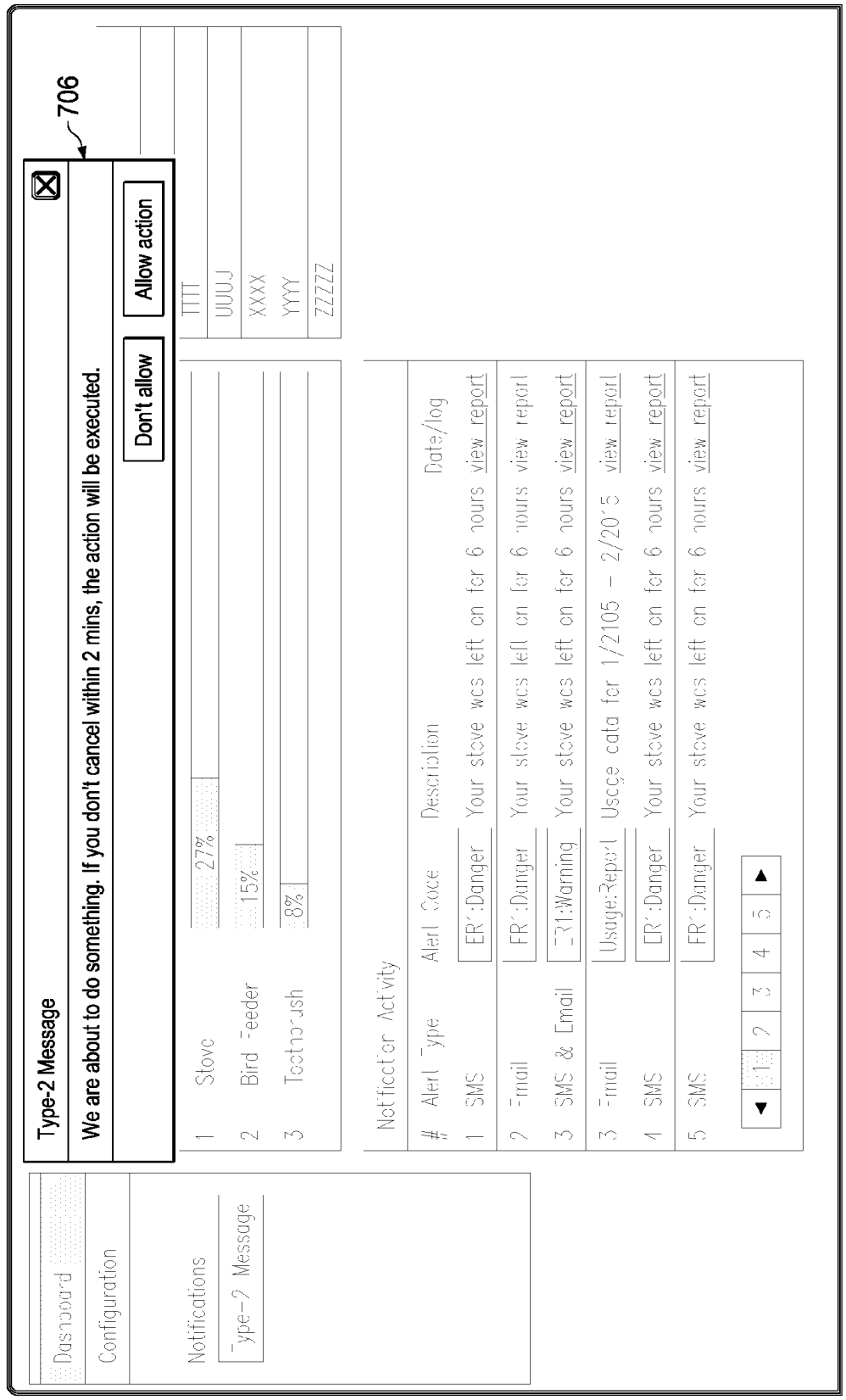
FIG. 7C illustrates an exemplary type-2 message presented on the user interface of FIG. 1A.

FIG. 7C illustrates a Type-2 message pop-up on the display of user interface 118. In this example, the Type-2 message indicates that a policy is about to take an automatic action (e.g., cut electrical power to the stove) unless the user actively overrides the automatic action.

Figure 7D:
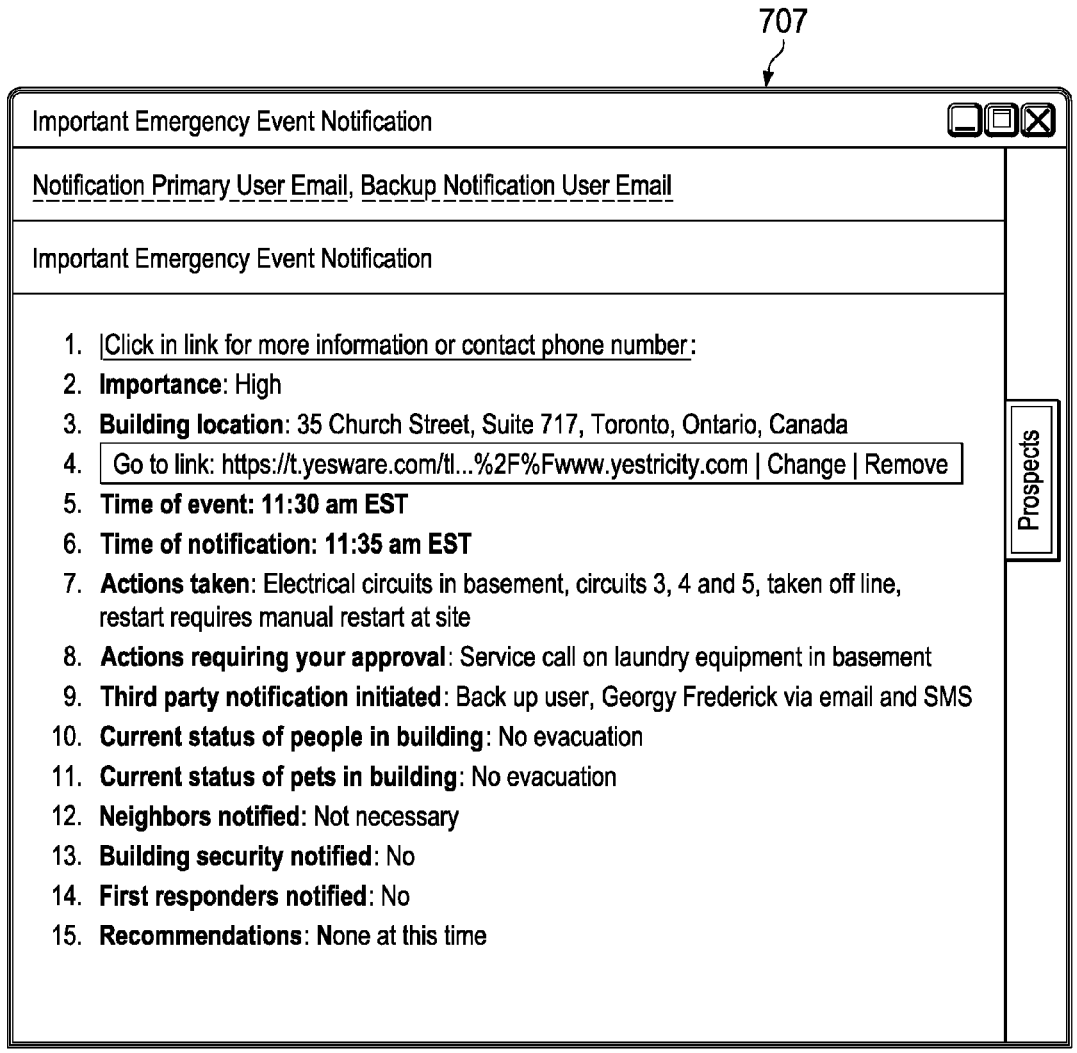
FIG. 7D illustrates an exemplary email emergency notification message sent to a user of the risk management system of FIG. 1A

FIG. 7D illustrates an exemplary window on the display of either user interface 118 or mobile device 122 showing an email message providing information regarding an emergency event, including information indicating the location of the emergency, an automatic actions taken, the status of people and property at the location, and the notifications issued.

Figure 7E:
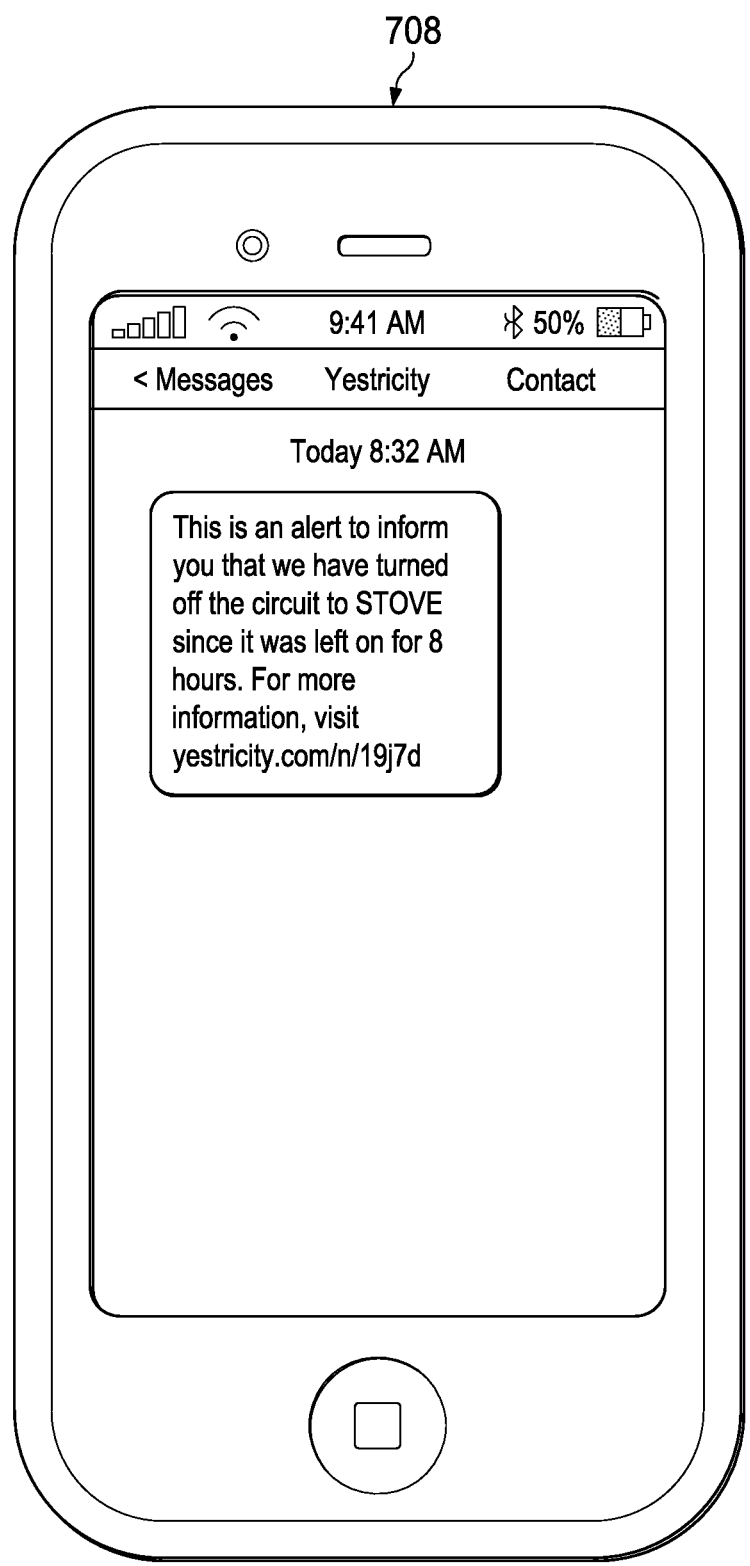
FIG. 7E illustrates an exemplary alert sent to the mobile device of a user of the risk management system of FIG. 1 reporting an action taken in response to a detected risk event.

A representative message sent to mobile device 122 indicating that system 100 has take an automatic action is shown in FIG. 7E.

Remote operations can be initiated and managed through a system or device such as mobile device 122 and remote management API. Generally, the API provides mechanisms for external systems to communicate with system 100, request information, or issue commands using the available policy, notification, triggers, and prescriptions. The remote management API can also be used with the test bed system as part of a two stage testing and publishing process. Conversely, through the remote management API, system 100 can also request information and send commands to third party APIs, which are cooperating or exchanging information with system 100, are being managed by system 100, or are managing system 100.

The remote management API, for example, may perform such specific tasks as:
1. Request a value of specific state or states in specific subsystem or edge apparatus, sensor, event, policy, prescription, trigger, or log;
2. Send one or more commands to one or more subsystems or edge apparatus;
3. Reset one or more subsystem or edge apparatus to factory default values;
4. Backup one or more subsystem or edge apparatus states, triggers, or policy and notification templates;
5. Restore backup to specific subsystem or edge apparatus;
6. Put a subsystem or edge apparatus in a test mode and designate test bed destination address;
7. Publish test bed settings to a subsystem or edge apparatus;
8. Restore previous version of settings to designated subsystem or edge apparatus;
9. Schedule a series of policy, notification, trigger, and prescription changes;
10. Execute a test suite;
11. Initiate a live test with notifications modified to indicate that the message is a test message;
12. Change the primary communications network;
13. Change backup communications network;
14. Disable soft break;
15. Disable hard break;
16. Restart soft break; and
17. Change mesh network link priority.

Analytics performed by one or more of cloud service 101, building server 103, and unit server 105 allow for an individual or entity, including a user, owner, manager, or insurance company to evaluate the risk presented by the systems within the structure monitored and controlled by system 100. The ability to monitor and mitigate risks is generally a function of the number, type, and embedded capabilities of sensors 110 and 114, smart plugs 112, equipment 112, breakers panel 115, and breakers 117. Hence the monitoring and mitigation capacity of system 100 is flexible and will vary from embodiment to embodiment.

Some representative factors that may be used during risk assessment include:
1. Lives at risk: The number of lives at risk at the current point in time in building (Risk scored based on number of people);
2. Value at Risk: The dollar value of potential damage (Risk scored by dollar value);
3. Technology Coverage Risk: The coverage of the structure by the particular embodiment of system 100, such as the number of branch circuits covered by breaker panel 115 and breakers 117, the number of pseudo-breakers 113, and the number and type of sensors 110 and 114 (Risk scored as very high, high, medium, low, or very low);
4. Adjacency Risk: Proximity or sharing with other owners, tenants, renters (Risk scored as very high, high, medium, low, or very low);
5. Exogenous Risk: Presence of nearby high risk sources, such train tracks, explosive or toxic inventories, and production operations (Risk scored as very high, high, medium, low, or very low);
6. Setup Risk: Completeness of setup and validation of system 100 and each of its subsystems (Risk scored as very high, high, medium, low, or very low);
7. Security Risk: Completeness and setup of users and permissions (Risk scored as very high, high, medium, low, or very low);
8. Event Type Risk: Rating of degree of risk for different risk types (Risk scored as very high, high, medium, low, or very low);
9. Notification Risk: Sufficient redundancy in user notification and methods of communication;
10. First Responder Risk: Successful set up and enablement of first responder notification policies, access and redundant communications (Risk scored as very high, high, medium, low, or very low);
11. Policy Risk: Strength of pre-programmed automated responses (Risk scored as very high, high, medium, low, or very low);
12. Equipment Risk: Incremental risk from high risk or old equipment, e.g., welding on site, gas vs. electricity (Risk scored as very high, high, medium, low, or very low);

13. Manual risk reduction: On premise staffing, fire extinguishers, and so on (Risk scored as very high, high, medium, low, or very low);
14. Mitigation Action Response Success: Based on historical data quantifying and qualifying the success in mitigating the risk by risk management system 100 or a similar system for a similar structure. (Success scored as very high, high, medium, low, or very low);
15. Recommendation Compliance: Based on historical data quantifying and qualifying the compliance of the user of system 100 or a similar system with recommendations made by system 100 (Success scored as very high, high, medium, low, or very low); and
16. Automated Action Success: Based on historical data quantifying and qualifying the success of automated actions taken by system 100 or a similar system for a similar structure to mitigate risk (Success scored as very high, high, medium, low, or very low).

From the risk factors used in the particular embodiment of system 100, a risk score is calculated by the subsystem performing the risk analytics (e.g., cloud service 101, building server 103, and/or unit server 105). The risk score, for the illustrated embodiment, is based on a numerical assignment to each level of risk based on a 100 point scale. For example, very high risk is scored at 100, a high risk is scored at 80, a medium risk is scored at 60, a low risk is scored at 40, and a very low risk is scored at 20. For actions such as mitigation response success, recommendation compliances, and automated action success, a reverse scale may be applied, wherein, for example, very low success rate is scored at 100, a low success rate is scored at 80, a medium success rate is scored at 60, high success rate is scored at 40, and very high success rate is scored at 20.

As shown in Table 8, one or more signs of problems might interact in the illustrated embodiment of system 100 for a number of representative situations. The example shown in Table 8 does not cover the situation where there is conflicting information from different information sources.

In this case, the importance of each input is compared to arrive at a conclusion. For example, for two conflicting inputs, the conclusion could be no problem, conflicting information, one strong one weak opposing sign, one weak sign, one opposing strong sign. As the number of inputs rises, the combinatorial complexity increases and rules for dispute resolution are provided in the system 100. The rules can evolve over time in response to manual or automated analysis of notifications, actions, outcomes and user feedback. The ability to have rules that consider multiple sensors can be useful. For example, with battery charging for a hybrid or electrical vehicle, measuring both the existence of charging and the status of the battery being charged is more useful than just knowing that the battery is being charged.

A Persona is a widely used approach for describing different types of users. It typically includes a description of the prototypical Persona background, skill level, knowledge and goal(s) that may vary depending upon a wide variety of factors. Persona definitions may vary depending on the particular embodiment of system 100 in place, as well the nature of the housing, buildings, commercial and industrials/transportation infrastructure. For the purposes of this description, a Persona requirement can be used to present the minimum information necessary for allowing fast and effective achievement of goals and shapes the user interface screens.

Table 10 illustrates a typical set of personas participating in the design, setup, management, and use of system 100.

In sum, the principles of the present invention take advantage of information from sensors, intelligent control devices and equipment, smart breaker devices, in-unit/building/infrastructure controller(s) and external services at data centers or in the cloud to provide more granular data on electricity usage. These more granular data meet the more demanding requirements of hazard risk management, as well as allow for the identification of problems such as leakage, overconsumption, and system inefficiencies. The ultimate goals are to reduce risk, minimize the impact of hazardous events when they do occur, and save time and money.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

APPENDIX

TABLE 1

| Trigger Condition | Sensing Subsystem | Action | Notification | Analysis |
|---|---|---|---|---|
| Pattern of arc faults | Pseudo-breaker 113 Circuit Breaker 117 | If risk crosses policy threshold, initiate soft trip of at least one circuit breaker 117. When available, combine data on pattern of arc faults with temperature rise and fall data. Generate recommended change in status for corresponding branch circuit 121, smart plugs 111, and/or equipment 112 from pattern of arc faults and temperature data: manual check | Recommended change in status for corresponding branch circuit 121, smart plugs 111, and/or equipment 112 | Time series analysis of temperature rise, demand for electricity, and/or spike information from subsystem on-off transitions. Associate recommended actions with time series analysis. |

TABLE 1-continued

| Trigger Condition | Sensing Subsystem | Action | Notification | Analysis |
|---|---|---|---|---|
| | | change in usage pattern disconnection replacement. | | Save pattern of arc faults for benchmarking and improvement of arc fault signatures. |
| Smoke detected and temperature of electrical circuit higher than normal. | Internal Sensors 114: smoke detector. electrical line temperature sensor. Breakers 117. | Depending on the location of the smoke and temperature rise: Switch off entire breaker panel 115. Switch off individual smart plugs 111, equipment 112 and/or circuit breakers 117. Depending on the severity of the event, policy can be recommended or automatic. | Those designated in notification template for this class of event. | Associate pre-conditions for event trigger for future analysis of time series events. Access risk to adjacent units in multi-tenant/ multi-unit buildings. |
| Natural gas supply anomaly, such as leak detected, unusual flow, leak detected in specific location on property. | Internal Sensors 114: Natural gas detectors. Associated with gas distribution system. | Depending on the location and severity of the event: Switch off gas supply immediately. Notify gas utility for upstream switch off of gas supply. Switch off entire breaker panel 115. Switch off individual smart plugs 111, equipment 112 and/or circuit breakers 117. | Those designated in notification template for this class of event. | Associate pre-conditions for event trigger for future analysis of time series events. Access risk to adjacent units in multi-tenant/ multi-unit buildings. |
| Change in natural gas risk on adjacent property. | External Sensors 110: Natural gas detectors. Associated with gas distribution system. | If risk crosses policy threshold, initiate soft trip of at least one circuit breaker 117 associated with particular rooms or areas. Generate recommended change in status for corresponding branch circuit 121, smart plugs 111, and/or equipment 112. | Recommended change in status for corresponding circuit 121, smart plugs 111, and/or equipment 112 Notifications to neighbor/ adjacent property owner based on notification template. | Event recorded and correlated with other information for future predictions regarding the likelihood of the same or similar event occurring. |
| Flood warning or detection of water in building/ infrastructure | External Sensors 110: Water outside building. Water on adjacent property. Internal Sensors 114: Water. Communicated flood warnings | Depending on the location of the detected water: Switch off entire breaker panel 115 for designated period of time Switch off individual smart plugs 111, equipment 112 and/or circuit breakers 117 associated with particular rooms or areas Depending on the severity of the event, policy can be recommended or automatic. | Those designated in notification template for this class of event. | After event collection of information about flooding severity for assessing restoration of electrical power. Analysis preferably done by cloud service 101 if electricity disrupted |
| Earthquake on short warning (<one minute). Series of earthquakes detected. | Communicated warnings. External Sensors 110: Ground motion outside building. Ground motion on adjacent | Depending on the event: Switch off entire breaker panel 115 for designated period of time Switch off individual smart plugs 111, equipment 112 and/or circuit breakers 117 associated with particular rooms or | Those designated in notification template for this class of event. | After event collection of information about flooding severity for assessing restoration of electrical power, gas, and water. Analysis |

TABLE 1-continued

| Trigger Condition | Sensing Subsystem | Action | Notification | Analysis |
|---|---|---|---|---|
| | property. Internal Sensors 114: Structural motion | areas. Shut off natural gas supply. Shut off water supply. Depending on the severity of the event, policy can be recommended or automatic. Automatic action preferred in the event of a short warning. | | preferably done by cloud service 101 if electricity disrupted. |

TABLE 2

| Action | Subsystems Invoked |
|---|---|
| Recommend buying action, e.g., change utility company, chance utility pricing program, replace equipment. | Cloud service 101 Building Server 103/Unit Server 105 Pseudo-breakers 113 Breaker panel controller 116 Breakers 117 |
| Recommend usage change to reduce hazard risk. | Cloud service 101 Building Server 103/Unit Server 105 Breakers 117 |
| Recommend maintenance, replacement or inspection actions. | Cloud service 101 Building Server 103/Unit Server 105 External sensors 110 Internal sensors 114 Breakers 117 Equipment 112 |
| Recommended policy change for risk management. | Cloud service 101 Building Server 103/Unit Server 105 Internal sensors 110 Smart plugs 111 Equipment 112 Pseudo-breakers 113 Breaker panel controller 116 Breakers 117 |
| Suggest immediate action to mitigate hazard risk or reduce energy usage. | Cloud service 101 Building Server 103/Unit Server 105 |
| Suggest immediate action to mitigate hazard risk or to reduce energy usage with move to automated action within specified time window. | Cloud service 101 Building Server 103/Unit Server 105 |
| Automated Immediate Action to address emergency, mitigate risk, or reduce energy usage. | Cloud service 101 Building Server 103/Unit Server 105 Smart plugs 111 Pseudo-breakers 113 Equipment 112 Internal sensors 110 Breaker panel controller 116 Breakers 117 |
| Automated Action and First Responder Notification to address emergency. | Cloud service 101 Building Server 103/Unit Server 105 |
| Automated Action, First Responder Notification, and Adjacent Notifications to address notification. Prescription. | Cloud service 101 Building Server 103/Unit Server 105 External sensors 110 Cloud service 101 Building Server 103/Unit Server 105 Smart plugs 111 Pseudo-breakers 113 Equipment 112 External sensors 110 Internal sensors 114 Breaker panel controller 116 Breakers 117 |

TABLE 3

| Event | Alt 1 | Alt 2 | Alt 3 | Alt 4 | Alt 5 | Alt 6 | Alt 7 |
|---|---|---|---|---|---|---|---|
| Arc fault | Ignore/ Notification Only | Soft break | Hard break | Soft break with timer interval set | Add to analysis time series | Compare to benchmarks | Look for related sensor and messaging activity |
| Ground fault | Ignore/ Notification Only | Soft break | Hard break | Soft break with timer interval set | Add to analysis time series | Compare to benchmarks | Look for related sensor and messaging activity |
| Lightning pre-strike detection | Ignore/ Notification Only | Soft break | Hard break | Building shutdown | Specific equipment shutdown | Specific plug shutdown | Specific power bar shutdown |
| Circuit temperature | Ignore/ Notification Only | Soft break | Hard break | Building shutdown | Specific equipment shutdown | Specific plug shutdown | Specific power bar shutdown |
| Smoke and fire | Ignore/ Notification Only | Soft break | Hard break | Building shutdown | Specific equipment shutdown | Specific plug shutdown | Specific power bar shutdown |
| Flooding, internal | Ignore/ Notification Only | Soft break | Hard break | Building shutdown | Specific equipment shutdown | Specific plug shutdown | Specific power bar shutdown |
| Equipment vibration | Ignore/ Notification Only | Soft break | Hard break | Building shutdown | Specific equipment shutdown | Specific plug shutdown | Specific power bar shutdown |

TABLE 3-continued

| Event | Alt 1 | Alt 2 | Alt 3 | Alt 4 | Alt 5 | Alt 6 | Alt 7 |
|---|---|---|---|---|---|---|---|
| $CO_2$ | Ignore/Notification Only | Soft break | Hard break | Building shutdown | Specific equipment shutdown | Specific plug shutdown | Specific power bar shutdown |
| CO | Ignore/Notification Only | Soft break | Hard break | Building shutdown | Specific equipment shutdown | Specific plug shutdown | Specific power bar shutdown |
| Radon | Ignore/Notification Only | Soft break | Hard break | Building shutdown | Specific equipment shutdown | Specific plug shutdown | Specific power bar shutdown |
| Ground movement | Ignore/Notification Only | Soft break | Hard break | Building shutdown | Specific equipment shutdown | Specific plug shutdown | Specific power bar shutdown |
| Ground movement multiple earthquakes | Ignore/Notification Only | Soft break | Hard break | Building shutdown | Specific equipment shutdown | Specific plug shutdown | Specific power bar shutdown |

TABLE 4

| Category | Use Case | Factors Considered |
|---|---|---|
| Notification | Fire prevention | Smoke detectors, temperature of circuit, arc or ground fault, gas leak, adjacent risk, predicted extreme weather, predicted lightning strike |
| Notification | Fire notice | Fire alarm, smoke detector, temperature, circuit temperature, electrical circuit or plug off line |
| Notification | Occupant and pet status notice | Inventory of occupants and pets in system 100 system, mobile app for reporting exits from building, accessible to first responders |
| Notification | Difficult to detect problem | Recommendation based upon pattern recognition applied to faults, usage and adjacent data |
| Notification | Multi-factor problem | Elevated risk rating due to multiple signs of problem |
| Notification | Earthquake notification short lead time | Automatic mitigation based upon short lead time earthquake notification |
| Notification | Recommended earthquake series mitigation | Recommendation based upon series of earthquakes and predicted risk of earthquakes of particular size |
| Notification | Non-electrical system sensor | Report that sensor reading is out of tolerances, or prescription requirements not being filled |
| Notification | Pipes at risk | Notification that trend or current temperature in building temperature may threaten expensive pipe freezing and breakage |
| Notification | Pets at risk | Notification that trend in building temperature may threaten expensive pipe freezing and breakage |
| Notification | People and pets at risk report | Listing of building people and pet occupants |
| Notification | Priority item removal | List of key items for removal in emergency and their location |
| Notification | Initiate backup | Risk profiles suggests immediate back up of data on one or more devices |
| Notification | Paranoid parent report | Unusual pattern of electricity or sensor readings suggests problem at home, e.g. leaving electric stove on, gas leak, too many lights on, electric or hybrid vehicle not charging, electrical system has too many trips, etc. |
| Notification | Mitigation report | Recent automated and manual mitigation activities |
| Notification | Mitigation history report | Log of automated and manual mitigation activities |
| Notification | Costing by circuit | Cost of electric consumption by circuit sent on request or according to a schedule |
| Notification | Costing by plug | Cost of electric consumption by plug sent on request or according to a schedule |
| Notification | Costing by equipment | Cost of electric consumption by piece of equipment or grouping of equipment items on a plug or circuit sent on request or according to a schedule |
| Notification | Demand response action report | Automatic demand response energy reduction for given time period |
| Notification | Graceful degradation report | Recent circuit, plug or equipment energy reduction actions made |
| Notification | First responder actions taken | Notifications to first responders (commercial services or public services) plus responses from services and actions taken, status of people and pet removal from building/unit |

TABLE 4-continued

| Category | Use Case | Factors Considered |
|---|---|---|
| Notification | Equipment efficiency report | Equipment efficiency by period and trend |
| Notification | Recommended servicing action | Recommended notification |
| Notification | Estimated savings from servicing | Recommended service plus predicted cost savings |
| Notification | Filter replacement recommendation | Recommended replacement plus predicted cost saving |

TABLE 5A

| Status | Possible States |
|---|---|
| Event | Event/No Event |
| Automated remediation | Executed, Pending, None |
| Notification | Notified with confirmation, notified with no confirmation, not notified |
| Manual Remediation | Executed, pending, rejected |
| Risk Level | 100 point scale |
| Setup | 100 point scale |
| Security and permissions setup | 100 point scale |
| Individual equipment | Working and communicating, working, and not communicating |
| Analytics | Completed, not completed |
| Pending recommendation | For each recommendation, accepted, pending, rejected |
| Backup | Setup and current, setup and not current, not setup |
| Recent Test | Acceptable, not acceptable |
| Recent communications test | Acceptable, not acceptable |
| Stakeholder queue | For each stakeholder, notification status |
| First responder | Setup, setup and tested, setup tested and in communication |

TABLE 5B

| Status | Possible States |
|---|---|
| Event | Event/No Event |
| Automated remediation | Executed, Pending, None |
| Notification | Notified with confirmation, notified with no confirmation, not notified |
| Manual Remediation | Executed, pending, rejected |
| Risk Level | 100 point scale |
| Setup | 100 point scale |
| Security and permissions setup | 100 point scale |

TABLE 5C

| Status | Possible States |
|---|---|
| Event | Event/No Event |
| Automated remediation | Primary network functioning, second network substituted, no network working |
| Notification | Network status communicated to cloud and controller/server, not communicated |

TABLE 5C-continued

| Status | Possible States |
|---|---|
| Risk Level | 100 point scale |
| Individual equipment | Working and communicating, working, and not communicating |

TABLE 5D

| Status | Possible States |
|---|---|
| Event | Circuit event yes/no |
| Automated remediation | Hard trip status yes/no; soft trip status yes/no |
| Notification | Communicated, not communicated |
| Manual Remediation | Executed, pending, rejected |
| Risk Level | 100 point scale |
| Individual equipment | Working and communicating, working, and not communicating |

TABLE 5F

| Status | Possible States |
|---|---|
| Event | Circuit event yes/no |
| Automated remediation | Event code type: arc faults, multiple arc faults, ground faults, lightning, temperature, natural gas, gas mains, smoke, multiple circuit arc faults, multiple circuit multiple arc faults, multiple circuit lightning, multiple circuit temperature, multiple circuit natural gas, multiple circuit gas mains, multiple circuit smoke, adjacent arc faults, adjacent multiple arc faults, adjacent ground faults, adjacent lightning, adjacent temperature, adjacent natural gas, adjacent gas mains, adjacent smoke |
| Notification | Communicated, not communicated |
| Manual Remediation | Executed, pending, rejected |
| Risk Level | 100 point scale |
| Individual equipment | Working and communicating, working, and not communicating |

TABLE 5G

| Status | Possible States |
|---|---|
| Event | Mobile device active or inactive |
| Notification | Communicated, not communicated |
| Risk Level | 100 point scale |

TABLE 6

| First Source Detection | Second Source Detection - Neutral | Second Source Detection - Increased Risk | Second Source Detection Potentially Large Increase In Risk |
|---|---|---|---|
| Arc Fault | $CO_2$ | Arc Fault | |
| | CO | Ground Fault | |
| | Radon | Lightning Pre-strike | |

TABLE 6-continued

| First Source Detection | Second Source Detection - Neutral | Second Source Detection - Increased Risk | Second Source Detection Potentially Large Increase In Risk |
|---|---|---|---|
| Ground Fault | $CO_2$<br>CO<br>Radon | conditions<br>Circuit Temperature<br>Smoke and Fire<br>Flooding (Internal)<br>Equipment Vibration<br>Ground Movement<br>Arc Fault<br>Ground Fault<br>Lightning Pre-strike conditions<br>Circuit Temperature<br>Smoke and Fire<br>Flooding (Internal)<br>Equipment Vibration<br>Ground Movement | |
| Lightning Pre-strike conditions | $CO_2$<br>CO<br>Radon<br>Ground Fault<br>Circuit Temperature<br>Smoke and Fire | Arc Fault<br>Lightning Pre-strike conditions<br>Flooding (Internal)<br>Equipment Vibration<br>Ground Movement | |
| Circuit Temperature | $CO_2$<br>CO<br>Radon<br>Lightning Pre-strike conditions | Ground Fault<br>Flooding (Internal)<br>Equipment Vibration<br>Ground Movement | Arc Fault<br>Circuit Temperature<br>Smoke and Fire |
| Smoke and Fire | $CO_2$<br>CO<br>Radon<br>Lightning Pre-strike conditions | Ground Fault<br>Circuit Temperature<br>Smoke and Fire<br>Flooding (Internal)<br>Equipment Vibration<br>Ground Movement | Arc Fault<br>Circuit Temperature<br>Smoke and Fire |
| Flooding (Internal) | $CO_2$<br>CO<br>Radon | Arc Fault<br>Ground Fault<br>Smoke and Fire<br>Circuit Temperature<br>Equipment Vibration<br>Ground Movement | Lightning Pre-strike conditions<br>Flooding (Internal) |
| Equipment Vibration | $CO_2$<br>CO<br>Radon<br>Ground Fault<br>Circuit Temperature<br>Smoke and Fire | Arc Fault<br>Ground Fault<br>Lightning Pre-strike conditions<br>Circuit Temperature<br>Smoke and Fire<br>Flooding (Internal)<br>Equipment Vibration<br>Ground Movement | |
| $CO_2$ | Arc Fault<br>Ground Fault<br>Lightning Pre-strike conditions<br>Circuit Temperature<br>Smoke and Fire<br>Flooding (Internal)<br>Equipment Vibration<br>Ground Movement<br>$CO_2$<br>CO<br>Radon | | |
| CO | Arc Fault<br>Ground Fault<br>Lightning Pre-strike conditions<br>Circuit Temperature<br>Smoke and Fire<br>Flooding (Internal)<br>Equipment Vibration<br>Ground Movement<br>$CO_2$<br>CO<br>Radon | | |

TABLE 6-continued

| First Source Detection | Second Source Detection - Neutral | Second Source Detection - Increased Risk | Second Source Detection Potentially Large Increase In Risk |
|---|---|---|---|
| Radon | Arc Fault<br>Ground Fault<br>Lightning Pre-strike conditions<br>Circuit Temperature<br>Smoke and Fire<br>Flooding (Internal)<br>Equipment Vibration<br>Ground Movement<br>$CO_2$<br>CO<br>Radon | | |
| Ground Movement | $CO_2$<br>CO<br>Radon | Arc Fault<br>Ground Fault<br>Lightning Pre-strike conditions<br>Circuit Temperature<br>Smoke and Fire<br>Flooding (Internal)<br>Equipment Vibration<br>Ground Movement | Ground Movement |

TABLE 7

| Epic Short Name | Epic Description | Possible States |
|---|---|---|
| Subsystem | Setting up system to recognize subsystems to be monitored | Factory Default, User Default, Edited, Published (Current) |
| Subsystem Controller Account | Setting up subsystem controller account and user level | Factory Default, User Default, Edited, Published (Current) |
| Delegation Switch | Setting up controller delegation on individual subsystem and subsystem policies. | Factory Default, User Default, Edited, Published (Current) |
| Cloud - Subsystem Controller Account | Link subsystem controller to cloud account and setting up syncing parameters. | Factory Default, User Default, Edited, Published (Current) |
| Subsystem Security | Security permissions set up and modification | Factory Default, User Default, Edited, Published (Current) |
| Reporting - System Status | Reporting - querying status of system for building approval or by general user | Factory Default, User Default, Edited, Published (Current) |
| Reporting - Subsystem | Reporting - querying status of system for subsystem monitoring with reporting to building manufacturer, service provider or contractor/reseller. | Factory Default, User Default, Edited, Published (Current) |
| Event Policy | Policy setting for managing system, including setting of soft trip limits. | Factory Default, User Default, Edited, Published (Current) |
| Subsystem Orchestration | Editing of subsystem in system including enabling, disabling, or changing specific subsystem policies. | Factory Default, User Default, Edited, Published (Current) |
| Smoke/Fire Event | Smoke/fire source listing, status listing, notification policy, contactee information and availability | Factory Default, User Default, Edited, Published (Current) |
| Electrical Event | Electrical problem policy setting, notification policy, contactee information and availability | Factory Default, User Default, Edited, Published (Current) |
| Earthquake Event | Earthquake event policy setting, notification policy, contactee information and availability | Factory Default, User Default, Edited, Published (Current) |
| Radon Event | Radon event policy setting, notification policy, contactee information and availability | Factory Default, User Default, Edited, Published (Current) |
| $CO/CO_2$ Event | $CO/CO_2$ or other gas (excluding natural gas) event policy setting, notification policy, contactee information and availability | Factory Default, User Default, Edited, Published (Current) |

TABLE 7-continued

| Epic Short Name | Epic Description | Possible States |
| --- | --- | --- |
| Temperature Event | Temperature event policy setting, notification policy, contactee information and availability | Factory Default, User Default, Edited, Published (Current) |
| Natural Gas | Natural event policy setting, notification policy, contactee information and availability | Factory Default, User Default, Edited, Published (Current) |
| Add New Sensor Type | New sensor event policy setting, notification policy, contactee information and availability | Factory Default, User Default, Edited, Published (Current) |
| Adjacent Policy | Adjacent policy setting for building potentially affected by specify problem | Factory Default, User Default, Edited, Published (Current) |
| Arc Fault Policy | Risk rating framework for arc fault | Factory Default, User Default, Edited, Published (Current) |
| Arc Series Fault Policy | Risk rating framework patterns of arc fault | Factory Default, User Default, Edited, Published (Current) |
| Ind Equip Policy | Risk rating framework for specific piece of subsystem | Factory Default, User Default, Edited, Published (Current) |
| Equip Arc Fault Matrix Policy | Risk rating framework for combinations of subsystem and arc fault interactions | Factory Default, User Default, Edited, Published (Current) |
| Earthquake Policy | Risk rating framework for earthquake | Factory Default, User Default, Edited, Published (Current) |
| Radon Policy | Risk rating framework for radon | Factory Default, User Default, Edited, Published (Current) |
| $CO/CO_2$ Policy | Risk rating framework for $CO/CO_2$ | Factory Default, User Default, Edited, Published (Current) |
| Temperature Policy Matrix | Risk rating framework for temperature with different policies for different parts of electrical system and different location in home, different subsystem, etc. | Factory Default, User Default, Edited, Published (Current) |
| Natural Gas Policy Matrix | Risk rating for natural gas detection, measurement of natural gas flow, varying by location and co-location of subsystem | Factory Default, User Default, Edited, Published (Current) |
| Notification Policy Template Definition | Notification policy for different events | Factory Default, User Default, Edited, Published (Current) |
| Trigger Definitions | Notification templates for triggering by different events including whom to notify, how fast to notify, obtaining confirmation of notification, second tier notifications, triggering of automated responses, notification around automated reponses | Factory Default, User Default, Edited, Published (Current) |
| Automated Trigger Criteria | Triggers (sets of conditions) for automated mitigation actions including soft breaks and hard breaks | Factory Default, User Default, Edited, Published (Current) |
| Soft Restart Policy | Reset polices and criteria for restarting soft breaks | Factory Default, User Default, Edited, Published (Current) |
| Maintenance Rules | Rules for identifying patterns of arc faults, subsystem problems, preemptive maintenance, removal or replacement of wiring, breakers, subsystem, etc. | Factory Default, User Default, Edited, Published (Current) |
| Subsystem Check Procedure | Subsystem check. | Factory Default, User Default, Edited, Published (Current) |
| Subsystem Reboot | System reboot. Subsystem reboot. | Factory Default, User Default, Edited, Published (Current) |
| Backup and Restore | System backup and restore. Individual piece of subsystem back-up and restore. | Factory Default, User Default, Edited, Published (Current) |
| Device Registration | Register subsystem on network, machine address, IP address | |
| Device Discovery and Inventory | Search for subsystem on network | |
| Check for Firmware Updates | Send message to device to verify version of firmware and update firmware if required | |

TABLE 7-continued

| Epic Short Name | Epic Description | Possible States |
| --- | --- | --- |
| Test Communication Network | Ping subsystem on network to test for ability to exchange information | |
| Test Backup Network | Use backup network to test sending commands and receiving data | |
| Test Mesh Network | Run test on network which removes elements of network forcing use of different link path | |
| Test Pseudo Breaker Delegation | Test messaging and delegation from pseudo-breaker to see that tripping is fired on delegated subsystem | |
| Test Notification Templates | Run a test of the notification template with actual recipients or to a testbed gathering point for emails, instant messages and voice calls. | |
| Test Sample Events | Put subsystem in test mode, send sample data and trap responses at testbed | |
| Test Sensors | Put sensor in test mode and send back sample information | |
| Test Internet Notifications | Run notification templates to testbed or actual recipients | |

TABLE 8

| Epic Short Name | Epic Description | Possible States |
| --- | --- | --- |
| Parameter Tuning - Sensitivities | Editing parameters in subsystems to change tolerances and sensitivities | Factory Default, User Default, Edited, Published (Current) |
| Parameter Tuning - Internet Sources | Editing Internet notification policies | Factory Default, User Default, Edited, Published (Current) |
| Report - Risk Profile | Create risk profile report for one-time or scheduled use. | Factory Default, User Default, Edited, Published (Current) |
| Test - Risk Profile Report | Create prototype report with current data | Factory Default, User Default, Edited, Published (Current) |
| Report - Time Series on Risk | Create report for designated risks over time | Factory Default, User Default, Edited, Published (Current) |
| Report - Circuit Specific | Usage, risk and spike information over requested time period | Factory Default, User Default, Edited, Published (Current) |
| Report - Smart Plug | Usage, risk and spike information over requested time period | Factory Default, User Default, Edited, Published (Current) |
| Report - Smart Powerbar | Usage, risk and spike information over requested time period | Factory Default, User Default, Edited, Published (Current) |
| Report - Ind Equip/Appliance | Usage, risk and spike information over requested time period | Factory Default, User Default, Edited, Published (Current) |
| Report - Arc Fault Pattern Recognition | Categorizations of repeating or evolving arc faults | Factory Default, User Default, Edited, Published (Current) |
| Report - Usage Pattern Recommendation | Using pricing plan information, rule based recommendations on savings and safety | Factory Default, User Default, Edited, Published (Current) |
| Report - Pricing Model Recommendation | Comparison of usage information between different pricing plans or different electricity suppliers | Factory Default, User Default, Edited, Published (Current) |
| Configure Graceful Degradation by Circuit | Identify high priority circuits for particular time periods or for different extreme events | Factory Default, User Default, Edited, Published (Current) |
| Configure Graceful Degradation by Circuit and Smart Plug | Identify high priority plugs for particular time periods or for different extreme events | Factory Default, User Default, Edited, Published (Current) |

TABLE 8-continued

| Epic Short Name | Epic Description | Possible States |
| --- | --- | --- |
| Configure Graceful Degradation by Circuit and Smart Plug and Equipment | Identify high priority plugs and/or equipment for particular time periods or for different extreme events | Factory Default, User Default, Edited, Published (Current) |
| Switch off Subbranch Using Pseudo Breaker | In case of a detected event, have pseudo-breaker send message to plugs or equipment in problem circuit brand to switch off electricity supply using a soft or hard trip | Factory Default, User Default, Edited, Published (Current) |
| Link Utility Account to Controller | Provide access information to controller and cloud for accessing utility account information and smart meter information | Factory Default, User Default, Edited, Published (Current) |
| Show Allocated Cost By Circuit | Calculate cost of circuit based upon a designated pricing plan | Factory Default, User Default, Edited, Published (Current) |
| Show Allocated Cost By Circuit and Smart Meter | Calculate cost of circuits for a specific smart meter connection, assuming multiple smart meters | Factory Default, User Default, Edited, Published (Current) |
| Show Allocated Cost By Equipment | Calculate cost of equipment usage using a specific pricing plan | Factory Default, User Default, Edited, Published (Current) |
| Compare Pricing Models | Compare two pricing plans | Factory Default, User Default, Edited, Published (Current) |
| Compare Energy Suppliers | Compare two energy suppliers and their pricing plans | Factory Default, User Default, Edited, Published (Current) |

TABLE 9

| Abstraction | Graph database objects | Notes |
| --- | --- | --- |
| Equipment | Smart meter 109 | Requires link to one or more breaker panels |
| Equipment | Breaker panel 115 | Optionally linked to Smart meter 109 |
| Equipment, controller hierarchy | Breaker panel controller 116 | Operating with breaker panel 115 |
| Equipment | Breaker | Operating with breaker panel 115 |
| Equipment | Smart breaker 117 | Operating with breaker panel 115 |
| Equipment, controller hierarchy | Smart breaker controller | Within breakers 117 |
| Equipment | Clamp on pseudo breaker | Operates with virtualized breaker functionality of pseudo-breakers 113 |
| Equipment | Smart plugs 111 with communications capability | |
| Equipment, controller hierarchy | Smart plugs 111 with breaker functionality and communications capabilities | |
| Equipment | Smart plug 111 with communications capability only | |
| Equipment | Equipment 112 with communications capability | |
| Equipment, controller hierarchy | Equipment 112 with embedded breaker | |
| Controller hierarchy | Standalone controller | |
| Controller hierarchy | Building Server 103/Unit Server 105 | |
| Controller hierarchy | Cloud service 101 | |
| Analytics | Analytics package running on at least one of cloud service 101, building server 103, or unit server 105 | |
| Security | User | |
| Security | User permissions | |
| Security | User notification policies | |
| Security | User contact information | Email, SMS, voice, varying suppliers for each |
| Analytics | Utility price plan | Time of day, usage, demand management, other |
| Analytics | Information source | Categorized by relevance to different sensors and events |

TABLE 9-continued

| Abstraction | Graph database objects | Notes |
| --- | --- | --- |
| Sensor | External sensor 110 outside building location | Categorized by relevance to different sensors and events |
| Sensor | Internal sensor 114 external to electrical system | Categorized by relevance to different sensors and events |
| Sensor | Electrical system internal sensor | Categorized by relevance to different sensors and events |
| Group membership | Room | |
| Group membership | Outlet | |
| Group membership | Receptacle | |
| Group membership | Powerbar | |
| Group membership | Powerbar plug | |
| Group membership | Equipment category | |
| Priority | Equipment priority | |
| Priority | Receptacle priority | |
| Priority | Outlet priority | |
| Priority | Circuit priority | |
| Priority | Customer priority | |
| Priority | Microgrid priority | |
| Priority | Region priority | |
| Location type | Type of room: residential types, business types, industrial types, infrastructure types | |
| Location risk profile | Electrical arc fault, ground fault, temperature, natural gas, radon, $CO_2$, earthquake | |
| Location risk profile | Loss of life, property value, business interruption costs, family interruption, time period of interruption, insurance consequences | |
| Location risk profile | Business brand and value cost from event | |
| Location risk profile | Cost of investigation from event | |
| Location risk profile | Impact upon neighbors costs of event | |
| Location risk profile | Legal costs of event | |
| Location risk profile | Customer impact of event | |
| Location risk profile | Supplier impact of event | |
| Adjacency risk | Condition assessment for spread of problem from Location A to Location B internal | |
| External adjacency | Spread of problem from owned/rented location to third parties | |
| Electricity data time series | Electricity consumption total | |
| Electricity data time series | Electricity consumption for circuit | |
| Electricity data time series | Electricity consumption by smart plug | |
| Electricity data time series | Electricity consumption by receptacle | |
| Electricity data time series | Electricity consumption by individual equipment | |
| Electricity data time series | Initial spike pattern | |
| Electricity data time series | Close spike pattern | |
| Electricity data time series upper and lower bounds | Electricity consumption for circuit tolerances | |
| Electricity data time series upper and lower bounds | Electricity consumption by smart plug tolerances | |
| Electricity data time series upper and lower bounds | Electricity consumption by receptacle tolerances | |
| Electricity data time series upper and lower bounds | Electricity consumption by individual equipment tolerances | |
| Electricity data time series upper and lower bounds | Initial spike pattern tolerances | |
| Electricity data time series upper and lower bounds | Close spike pattern tolerances | |
| Threshold level current setting | Circuit breaker voltage setting | |
| Threshold level current setting | Circuit breaker hard break setting | |

TABLE 9-continued

| Abstraction | Graph database objects | Notes |
|---|---|---|
| Threshold level current setting | Circuit breaker soft break setting current | |
| Threshold levels over time | Circuit breaker soft break setting time series | |
| Threshold levels over time | Circuit breaker policy time series | |
| Threshold level when event occurred | Circuit breaker policy setting event | |
| Policy template | Circuit breaker policy action automated | |
| Notification log | Notification activity | |
| Notification log | Post notification event | |
| Event log | Event occurrence | |
| Recommendation template | Recommendation | |
| Recommendation event log | Recommendation log | |
| Recommendation status log | Recommendation status | |
| Sensor | Flood sensor 110/114 | |
| Sensor | $CO_2$ sensor 110/114 | |
| Sensor | CO sensor 110/114 | |
| Sensor | Radon sensor 110/114 | |
| Sensor | Equipment vibration sensor 110/114 | |
| Sensor | Temperature sensor 110/114 | |
| Sensor | Ground movement sensor 110/114 | |
| Sensor | Building movement sensor 110/114 | |
| Sensor | Wind speed sensor 110/114 | |
| Sensor | Pre-lightning strike sensor 110/114 | |
| Sensor | Electric or hybrid vehicle in-vehicle charging sensor 110 | |
| Sensor | Charging station sensor 110 | |
| Sensor | Unspecified sensor 110/114 | |
| Sensor | Home weather station sensor (multiple types) 110/114 | |
| Security | User permissions | |
| Security | Device authentication state | |
| Security | User role type | |
| Security | Authenticated user devices for communication | |
| Security | Authenticated user contacts email | |
| Security | Authenticated user contacts SMS | |
| Security | Authenticated user voice line | |
| Security | Double authentication of information exchange with third party one way | |
| Security | Double authentication of information exchange with third party two way | |
| Supplier | Adjacent party list | List of adjacent parties at risk from event in user property |
| Supplier | Adjacent party list | List of properties sharing sub-region of utility or microgrid |
| Supplier | Utility suppliers major | Major suppliers |
| Supplier | Utility suppliers local | Local energy generation providing energy to sub-region or microgrid |
| Location risk profile, supplier | Utility network map | Map/listing of local utility grid and transmission hierarchy |
| Sensor | Smart meter details | Product, location, API, etc. information for relevant smart meter |
| Template | Template | Contact information for notification |
| Template | Policy template | Triggers and policies to be executed, with notifications |
| Template | Prescription | Set of conditions and parameters for particular time period which if not found should trigger a policy template(s) and notification(s) |
| Template | Trigger | A reusable description of an action or set of actions |
| Log | Log | A log of events, actions, results and user assessments of events, |

TABLE 9-continued

| Abstraction | Graph database objects | Notes |
|---|---|---|
| | | actions, and results including notifications |

TABLE 10

| Task | Persona(s) | Key Information | Equipment |
|---|---|---|---|
| Design Configuration | Electrical contractor Home owner | Inventory of equipment Location of electrical circuit Rooms serviced by electrical circuit Smart plugs 111 per room Power bars per smart plug 111 Equipment per receptacle | All installed subsystems and edge apparatus |
| Verification of design | Electrical contractor Building inspector Home owner | Matching equipment information and parameters to building code requirements | All installed equipment covered by building code for building inspector, and all subsystems and edge apparatus for other users |
| Parameter adjustment | Electrical contractor Home owner | Policies, triggers, prescriptions, notifications | All subsystem and edge apparatus with policies, triggers, prescriptions, and notifications |
| On the fly parameter adjustment | Utilities | Demand management programs accepted by an owner, user, or authorized party | Circuit level or subsystem level |
| User authentication | User designated as administrator | Verified contact information, including but not restricted to phone numbers at particular periods, emails, short messaging and instant messaging services | Cloud service 101, building server 103, unit server 105, or any subsystem or edge apparatus that can originate a notification, execute or delegate a policy. |
| Permission granting | User designated as administrator | Specific individual users and their membership in rights classes. Rights classes mapped to subsystems and edge apparatus | All subsystems and edge apparatus in secure zone. |
| System security and authentication | User designated as administrator | Mapping of subsystem and edge apparatus addresses, and subsystem and edge apparatus authentication. Encryption token and keys | All subsystems and edge apparatus in secure zone Authorized machines for notification receivers |
| Share information | User designated as administrator. Authorized decision maker in external stakeholders i.e. adjacent units/building and first responders | Permission to share information. Emergency access for first responders to access and/or shutdown components of system | All subsystems and edge apparatus Authenticated devices for stakeholders. Authenticated external stakeholders |
| Receive notifications | User designated as administrator | Authorizes subscription to emergency notification services | Cloud service 101, building server 103, and/or unit server 105 |

TABLE 10-continued

| Task | Persona(s) | Key Information | Equipment |
| --- | --- | --- | --- |
| Provide template | Publisher, manufacturer, service company, contract service company, utility, building code from building inspector | Provide pre-filled template for import into system to save users time | All subsystems and edge apparatus with policies, prescriptions, notifications, etc. |
| Prioritize usage for graceful degradation or demand response management programs | Home owner in negotiation with utility Contractor in negotiation with home owner | Prioritize circuits, regions of circuits (using a pseudo-breaker 113), smart plug 111, receptacle, smart power bar, receptacle on smart power bar, electricity consuming device | Potentially any element in system |
| Notify user of extreme event but confirm no action scheduled to be taken | Any user specified in notification policy | No action other than notification or schedule for review of information | Sensors 110 and 114 |

TABLE 3

| Event | Alt 1 | Alt 2 | Alt 3 | Alt 4 | Alt 5 | Alt 6 | Alt 7 |
| --- | --- | --- | --- | --- | --- | --- | --- |
| Arc fault | Ignore/ Notification Only | Soft break | Hard break | Soft break with timer interval set | Add to analysis time series | Compare to benchmarks | Look for related sensor and messaging activity |
| Ground fault | Ignore/ Notification Only | Soft break | Hard break | Soft break with timer interval set | Add to analysis time series | Compare to benchmarks | Look for related sensor and messaging activity |
| Lightning pre-strike detection | Ignore/ Notification Only | Soft break | Hard break | Building shutdown | Specific equipment shutdown | Specific plug shutdown | Specific power bar shutdown |
| Circuit temperature | Ignore/ Notification Only | Soft break | Hard break | Building shutdown | Specific equipment shutdown | Specific plug shutdown | Specific power bar shutdown |
| Smoke and fire | Ignore/ Notification Only | Soft break | Hard break | Building shutdown | Specific equipment shutdown | Specific plug shutdown | Specific power bar shutdown |
| Flooding, internal | Ignore/ Notification Only | Soft break | Hard break | Building shutdown | Specific equipment shutdown | Specific plug shutdown | Specific power bar shutdown |
| Equipment vibration | Ignore/ Notification Only | Soft break | Hard break | Building shutdown | Specific equipment shutdown | Specific plug shutdown | Specific power bar shutdown |
| $CO_2$ | Ignore/ Notification Only | Soft break | Hard break | Building shutdown | Specific equipment shutdown | Specific plug shutdown | Specific power bar shutdown |
| CO | Ignore/ Notification Only | Soft break | Hard break | Building shutdown | Specific equipment shutdown | Specific plug shutdown | Specific power bar shutdown |
| Radon | Ignore/ Notification Only | Soft break | Hard break | Building shutdown | Specific equipment shutdown | Specific plug shutdown | Specific power bar shutdown |
| Ground movement | Ignore/ Notification Only | Soft break | Hard break | Building shutdown | Specific equipment shutdown | Specific plug shutdown | Specific power bar shutdown |
| Ground movement multiple earthquakes | Ignore/ Notification Only | Soft break | Hard break | Building shutdown | Specific equipment shutdown | Specific plug shutdown | Specific power bar shutdown |

TABLE 6

| First Source Detection | Second Source Detection - Neutral | Second Source Detection - Increased Risk | Second Source Detection Potentially Large Increase In Risk |
|---|---|---|---|
| Arc Fault | $CO_2$<br>CO<br>Radon | Arc Fault<br>Ground Fault<br>Lightning Pre-strike conditions<br>Circuit Temperature<br>Smoke and Fire<br>Flooding (Internal)<br>Equipment Vibration<br>Ground Movement | |
| Ground Fault | $CO_2$<br>CO<br>Radon | Arc Fault<br>Ground Fault<br>Lightning Pre-strike conditions<br>Circuit Temperature<br>Smoke and Fire<br>Flooding (Internal)<br>Equipment Vibration<br>Ground Movement | |
| Lightning Pre-strike conditions | $CO_2$<br>CO<br>Radon<br>Ground Fault<br>Circuit Temperature<br>Smoke and Fire | Arc Fault<br>Lightning Pre-strike conditions<br>Flooding (Internal)<br>Equipment Vibration<br>Ground Movement | |
| Circuit Temperature | $CO_2$<br>CO<br>Radon<br>Lightning Pre-strike conditions | Ground Fault<br>Flooding (Internal)<br>Equipment Vibration<br>Ground Movement | Arc Fault<br>Circuit Temperature<br>Smoke and Fire |
| Smoke and Fire | $CO_2$<br>CO<br>Radon<br>Lightning Pre-strike conditions | Ground Fault<br>Circuit Temperature<br>Smoke and Fire<br>Flooding (Internal)<br>Equipment Vibration<br>Ground Movement | Arc Fault<br>Circuit Temperature<br>Smoke and Fire |
| Flooding (Internal) | $CO_2$<br>CO<br>Radon | Arc Fault<br>Ground Fault<br>Smoke and Fire<br>Circuit Temperature<br>Equipment Vibration<br>Ground Movement | Lightning Pre-strike conditions<br>Flooding (Internal) |
| Equipment Vibration | $CO_2$<br>CO<br>Radon<br>Ground Fault<br>Circuit Temperature<br>Smoke and Fire | Arc Fault<br>Ground Fault<br>Lightning Pre-strike conditions<br>Circuit Temperature<br>Smoke and Fire<br>Flooding (Internal)<br>Equipment Vibration<br>Ground Movement | |
| $CO_2$ | Arc Fault<br>Ground Fault<br>Lightning Pre-strike conditions<br>Circuit Temperature<br>Smoke and Fire<br>Flooding (Internal)<br>Equipment Vibration<br>Ground Movement<br>$CO_2$<br>CO<br>Radon | | |
| CO | Arc Fault<br>Ground Fault<br>Lightning Pre-strike conditions<br>Circuit Temperature<br>Smoke and Fire<br>Flooding (Internal)<br>Equipment Vibration<br>Ground Movement | | |

TABLE 6-continued

| First Source Detection | Second Source Detection - Neutral | Second Source Detection - Increased Risk | Second Source Detection Potentially Large Increase In Risk |
|---|---|---|---|
| Radon | $CO_2$<br>CO<br>Radon<br>Arc Fault<br>Ground Fault<br>Lightning Pre-strike conditions<br>Circuit Temperature<br>Smoke and Fire<br>Flooding (Internal)<br>Equipment Vibration<br>Ground Movement<br>$CO_2$<br>CO<br>Radon | | |
| Ground Movement | $CO_2$<br>CO<br>Radon | Arc Fault<br>Ground Fault<br>Lightning Pre-strike conditions<br>Circuit Temperature<br>Smoke and Fire<br>Flooding (Internal)<br>Equipment Vibration<br>Ground Movement | Ground Movement |

What is claimed is:

1. A system for hazard mitigation in a structure having an electrical distribution system including a circuit, comprising:
   a subsystem coupled to the circuit;
   a first set of nodes for monitoring operating conditions associated with the circuit and generating data in response;
   a second set of nodes for monitoring environmental conditions not associated with said circuit and generating data in response; and
   a data processing system operable to:
      process the data generated by said first set of nodes and said second set of nodes and identify a trigger representing a condition requiring an action be taken; and
      process the trigger in accordance with a predetermined policy to initiate an action by the subsystem.

2. The system of claim 1, wherein said first set of nodes is embedded within the subsystem.

3. The system of claim 1, wherein the data processing system includes a processor embedded within the subsystem.

4. The system of claim 1, wherein said first set of nodes comprises at least one sensor for monitoring an electrical parameter of electricity flow from the circuit to the subsystem.

5. The system of claim 4, wherein the electrical parameter is selected from the group consisting of voltage, current, arc faults, frequency, noise, and ground faults.

6. The system of claim 1, wherein said second set of nodes comprises at least one sensor for monitoring an environmental condition within the structure.

7. The system of claim 6, wherein the environmental condition is selected from the group consisting of the presence of water, the presence of smoke, and the presence of a gaseous substance.

8. The system of claim 1, wherein the subsystem further comprises tripping circuitry for controlling electrical current flow from the circuit, wherein the data processing system is operable to trip the tripping circuitry and halt current flow in response to the trigger in accordance with the policy.

9. The system of claim 8, wherein the data processing system includes a data processor in another subsystem within the system and the subsystem further comprises communications circuitry for receiving a command from the data processor of the another subsystem to trip the tripping circuitry of the subsystem.

10. The system of claim 9, wherein the another subsystem comprises a pseudobreaker.

11. The system of claim 1, wherein the data processing system further comprises a supervisory data processor for communicating at least one trigger definition and at least one policy to the data processor to the subsystem.

12. The system of claim 1, wherein the data processor is operable to process the trigger in accordance with the predetermined policy and initiate an automatic action by the subsystem.

13. The system of claim 1, wherein the data processor is operable to process the trigger in accordance with the predetermined policy and initiate transmission of a message recommending user action be taken with respect to the subsystem.

14. The system of claim 13, wherein the data processor is further operable to process the trigger in accordance with the predetermined policy and initiate an automatic action by the subsystem when no user action is taken within a predetermined time window.

15. A system for mitigating risk associated with an electrical distribution system comprising:
   a communications network;
   a first set of sensors coupled to the communications network for monitoring conditions associated with the electrical distribution system and generating data in response;

a second set of sensors for monitoring environmental conditions not associated with the electrical distribution system circuit and generating data in response;

a set of subsystems coupled to the electrical distribution system, each subsystem including a data processor and communications circuitry coupled to the communications network, wherein in response to data from said first set of sensors and said second set of sensors, the data processor of a selected subsystem identifies a trigger representing a condition requiring an action be taken and processes the trigger in accordance with a policy to initiate an action; and a supervisory subsystem coupled to the communications network for providing trigger definitions and policies to at least the data processor of the selected subsystem.

16. The system of claim 15, wherein at least one subsystem of the set of subsystems comprises a circuit breaker controlling a power distribution circuit within the electrical distribution system, wherein the data processor of the circuit breaker identifies a trigger in response to data from said first set of sensors and said second set of sensors and selectively trips in accordance with the policy to break the power distribution circuit.

17. The system of claim 15, the set of subsystems comprises:

a first subsystem including a circuit breaker controlling electricity flow from the electrical distribution system; and second subsystem, wherein the data processor of the second subsystem identifies the trigger and initiates tripping of the circuit breaker of the first subsystem in accordance with the policy.

18. The system of claim 17, wherein the second subsystem comprises a pseudobreaker.

19. The system of claim 15, wherein a selected subsystem of the set of subsystems includes at least one electrical plug and a circuit breaker for controlling electrical flow through the plug, wherein the data processor of the selected subsystem is operable to trip the circuit breaker in response to the trigger in accordance with the policy.

20. The system of claim 15, wherein a selected subsystem of the set of subsystem comprises equipment a circuit breaker for controlling electrical flow to the equipment, wherein the data processor of the selected subsystem is operable to trip the circuit breaker in response to the trigger in accordance with the policy.

21. The system of claim 15, wherein a selected sensor of said first set of sensors is embedded within a subsystem of the set of subsystems.

22. The system of claim 15, wherein a selected sensor of said first set of sensors monitors an electrical parameter of a circuit of the electrical distribution system.

23. The system of claim 15, wherein the electrical distribution system is associated with a structure and at least one sensor of the set of sensors monitors an environmental condition within the structure.

24. The system of claim 15, wherein the electrical distribution system is associated with a structure and at least one sensor of said second set of sensors monitors an environmental condition outside of structure.

25. The system of claim 15, wherein the data processor of the selected subsystem in response to the trigger sends a message to a user in accordance with the policy.

26. The system of claim 15, wherein the data processor of the selected subsystem in response to the trigger initiates automatic action by at least one subsystem.

27. The system of claim 15, wherein the data processor of the selected system in response to the trigger sends a message to a user and in response to a lack of user action within a time window initiates automatic action by the at least one subsystem in accordance with the policy.

28. The system of claim 15, wherein at least one subsystem of the set of the set of subsystem transmits operational data to the supervisory processing system for analysis and selective update of the trigger definitions and policies.

29. The system of claim 15, wherein the supervisory processing system comprises a server.

30. The system of claim 15, wherein the communications network is further operable to receive information from an external network and the data processor of the selected subsystem is further operable, in response to the information received from the external network, to identify a trigger representing a condition requiring an action be taken and process the trigger in accordance with a policy to initiate an action.

31. A method for mitigating hazards in a structure having an electrical distribution system including a circuit, comprising:

monitoring operating conditions associated with the circuit with a first set of nodes communicating with a network;

monitoring environmental conditions not associated with the circuit with a second set of nodes communicating with said network;

collecting data generated by said first set of nodes and said second set of nodes and representing the monitored operating conditions and monitored environmental conditions with a processor communicating with the network;

identifying with the processor a trigger from the collected data representing a condition requiring an action be taken; and processing the trigger with the processor in accordance with a predetermined policy to initiate a control action by at least one of the set of nodes.

32. The method of claim 31, wherein monitoring operating conditions associated with the circuit comprises monitoring a parameter associated with electrical flow through the circuit with at least one of the set of nodes.

33. The method of claim 32, wherein the parameter is selected from the group consisting of voltage, current, arc faults, frequency, noise, and ground faults.

34. The method of claim 31, wherein monitoring environmental conditions comprises monitoring an environmental condition within the structure.

35. The method of claim 34, wherein the environmental condition is selected from the group consisting of the presence of water, the presence of smoke, and the presence of a gaseous substance.

36. The method of claim 31, wherein processing the trigger with the processor in accordance with a predetermined policy to initiate a control action by at least one of comprises initiating tripping a circuit breaker by at least one of the set of nodes.

* * * * *